US009942783B2

(12) United States Patent
Fan et al.

(10) Patent No.: US 9,942,783 B2
(45) Date of Patent: *Apr. 10, 2018

(54) FEMTOCELL SERVICE THROUGH A SECONDARY CONNECTION

(71) Applicant: AT&T Intellectual Property I, L.P., Atlanta, GA (US)

(72) Inventors: James Fan, San Ramon, CA (US); Jennifer K. Lam, Fremont, CA (US); Cheng P. Liu, Johns Creek, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/293,238

(22) Filed: Oct. 13, 2016

(65) Prior Publication Data
US 2017/0034718 A1 Feb. 2, 2017

Related U.S. Application Data

(63) Continuation of application No. 14/263,919, filed on Apr. 28, 2014, now Pat. No. 9,474,076, which is a (Continued)

(51) Int. Cl.
*H04W 8/30* (2009.01)
*H04W 24/04* (2009.01)
(Continued)

(52) U.S. Cl.
CPC .............. *H04W 24/04* (2013.01); *H04W 8/30* (2013.01); *H04W 24/00* (2013.01);
(Continued)

(58) Field of Classification Search
CPC ...... H04L 29/08279; H04L 41/0654–41/0672; H04L 45/22; H04L 45/28; H04L 45/70;
(Continued)

(56) References Cited

U.S. PATENT DOCUMENTS 7,835,272 B1 11/2010 Johnson et al.
7,839,771 B2 11/2010 Zeng et al.
(Continued)

OTHER PUBLICATIONS

Office Action dated Jul. 23, 2012 for U.S. Appl. No. 12/845,131, 17 pages.
(Continued)

*Primary Examiner* — Timothy J Weidner
(74) *Attorney, Agent, or Firm* — Amin, Turocy & Watson, LLP

(57) ABSTRACT

Femtocell service is provided through a secondary connection to a network gateway node that is part of a service provider network. The secondary connection can be established in response to at least one telecommunication performance condition of a primary connection to the network gateway node; the at least one performance condition includes connectivity state of the primary connection or quality of traffic delivery through the primary connection. The secondary connection can be established, in part, via a home gateway node that is alternative to a home gateway node associated with a femtocell access point (AP) that enables, in part, the femtocell wireless service. The main home gateway node or the femtocell AP can initiate establishment of the secondary connection. Home gateway node(s) or femtocell AP(s) that can provide femtocell service through the secondary connection can manage connectivity with the network gateway node.

20 Claims, 11 Drawing Sheets

Related U.S. Application Data continuation of application No. 12/845,131, filed on Jul. 28, 2010, now Pat. No. 8,750,098.

(51) Int. Cl.

| | | |
|---|---|---|
| *H04W 28/02* | (2009.01) | |
| *H04W 40/02* | (2009.01) | |
| *H04W 72/04* | (2009.01) | |
| *H04W 76/02* | (2009.01) | |
| *H04W 76/04* | (2009.01) | |
| *H04W 84/04* | (2009.01) | |
| *H04W 88/16* | (2009.01) | |
| *H04W 24/00* | (2009.01) | |

(52) U.S. Cl.
CPC ....... *H04W 28/0289* (2013.01); *H04W 40/02* (2013.01); *H04W 72/0486* (2013.01); *H04W 76/02* (2013.01); *H04W 76/04* (2013.01); *H04W 84/045* (2013.01); *H04W 88/16* (2013.01)

(58) Field of Classification Search
CPC ...... H04L 67/1034; H04L 69/40; H04W 8/30; H04W 24/00–24/08; H04W 36/12; H04W 36/14; H04W 36/38–36/385; H04W 40/02; H04W 40/34–40/38; H04W 72/0486; H04W 76/02–76/048; H04W 84/045; H04W 88/14; H04W 88/16; H04W 92/00–92/24
See application file for complete search history.

(56) References Cited

U.S. PATENT DOCUMENTS

| | | | |
|---|---|---|---|
| 7,885,644 | B2 | 2/2011 | Gallagher et al. |
| 8,200,194 | B2 | 6/2012 | Wang et al. |
| 8,305,955 | B2 | 11/2012 | Diab et al. |
| 8,400,985 | B2 | 3/2013 | Ahmadi et al. |
| 8,750,098 | B2 * | 6/2014 | Fan ........................ H04W 24/04 370/225 |
| 9,474,076 | B2 * | 10/2016 | Fan ........................ H04W 24/04 370/225 |
| 2011/0149876 | A1 | 6/2011 | Venkatachalam |

OTHER PUBLICATIONS

Office Action dated Dec. 17, 2012 for U.S. Appl. No. 12/845,131, 17 pages.
Office Action dated Jul. 29, 2013 for U.S. Appl. No. 12/845,131, 24 pages.
Office Action dated Feb. 4, 2016 for U.S. Appl. No. 14/263,919, 16 pages.

* cited by examiner

FEMTOCELL SERVICE THROUGH A SECONDARY CONNECTION

CROSS-REFERENCE TO RELATED APPLICATIONS

This application is a continuation of, and claims priority to each of, U.S. patent application Ser. No. 14/263,919, filed on 28 Apr. 2014, and entitled "FEMTOCELL SERVICE THROUGH A SECONDARY CONNECTION," which is a continuation of U.S. patent application Ser. No. 12/845,131, filed on 28 Jul. 2010, now U.S. Pat. No. 8,750,098, entitled "FEMTOCELL SERVICE THROUGH A SECONDARY CONNECTION." The entireties of these applications are hereby incorporated by reference herein.

TECHNICAL FIELD

The subject disclosure relates to telecommunication networks and, more particularly, to providing femtocell service through a secondary telecommunication channel.

BACKGROUND

Network operators generally provide voice and data services, such as digital television, internet protocol (IP) television, media on demand, and voice over internet protocol (VoIP) communications, over broadband internet access. To provide voice or data services, network operators typically install customer premises equipment (CPE) that serves as a home gateway node. When the connection between the home gateway node and wide area network element(s) that provide the voice or data services is inoperable or unstable, or the home gateway node malfunctions, all communication between subscriber premises and service provider network are generally lost or compromised.

In certain telecommunication networks that provide wireless service, network operators deploy access points within subscriber premises to offload macrocell wireless traffic or to improve macrocell service within the subscriber premises. Such access points are commonly deployed in area(s) where macrocell traffic is heavy or frequently congested, or wireless signals associated with macrocell wireless service is weak and deployment of additional macrocells may not be economically feasible. To relay traffic and signaling from subscriber devices to the service provider network, the access points within the subscriber premises typically connect to the service provider network via home gateway node(s); the communication link amongst a subscriber device and an access point is wireless, and the connection to the service provider network is over a broadband network connection. In conventional telecommunication networks, when the broadband network connection is compromised (lost, unstable, underperforming, etc.) or when a home gateway node associated with the broadband network connection malfunctions, wireless service provided through an access point deployed in subscriber premises and linked to the home gateway node fails—e.g., current call sessions are lost and new call sessions are then routed through macrocell. Accordingly, commercial viability and acceptable perceived quality of service of a deployment of access points that supplement or complement wireless service(s) of a macrocell deployment is dictated largely by the reliability of broadband network connection and home gateway node(s) associated with such access points.

DETAILED DESCRIPTION

Figure 1:
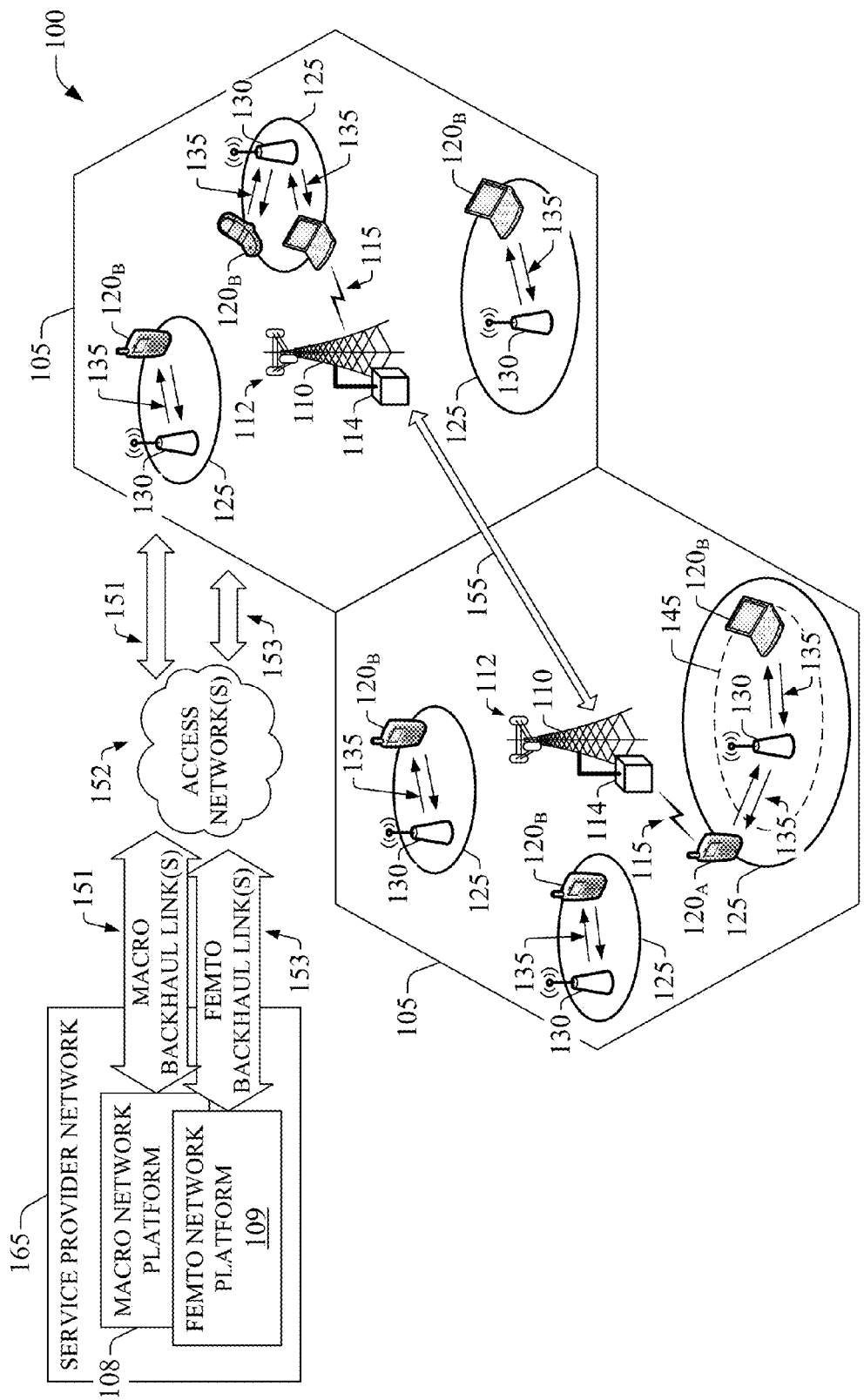
FIG. 1 illustrates a schematic deployment of a macrocells and femtocells for wireless service coverage in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the present disclosure. It may be evident, however, that the present disclosure may be practiced without these specific details. In other instances, well-known structures and devices are shown in block diagram form in order to facilitate describing the present disclosure.

As employed in this specification and annexed drawings, the terms "component," "system," "platform," "interface," "node," "coder," "decoder", "layer," and the like are intended to refer to a computer-related entity or an entity related to an operational apparatus with one or more specific functionalities, wherein the such entities can be either hardware, a combination of hardware and software, software, or software in execution. One or more of such entities are also referred to herein as "functional elements." As an example, a component may be, but is not limited to being, a process running on a processor, a processor, a memory, a code object, an executable code instruction, a thread of execution, a program, and/or a computer. By way of illustration, both an application running on a server and the server can be a component. One or more components may reside within a process and/or thread of execution and a component may be localized on one computer and/or distributed between two or more computers. In addition, these components can execute from various computer readable media having various data structures or code instructions stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, node, driver, coder, decoder, layer, and the like.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP);" "base station," "Node B;" "evolved Node B (eNode B);" "home Node B (HNB)" or "home access point (HAP)," which include femtocell access point, picocell access point, Wi-Fi base station . . . ; and the like, are utilized interchangeably in the subject application, and refer to a wireless network component or apparatus that at least delivers and receives data, control, voice, video, sound, gaming, or substantially any or any data stream or signaling stream. Sources or recipients of such data, control, voice, video, sound, gaming, or substantially any or any data stream or signaling stream can be at least a set of network components such as, but not limited to, user equipment, customer premises equipment, or network servers, controllers, gateways or management components. Data and signaling streams can be packetized or frame-based flows. It is noted that context in the subject specification generally distinguishes amongst a base station that provides or is intended to provide primarily outdoor wireless coverage and a facility-based access point (e.g., femtocell AP) that provides or is intended to provide primarily indoor wireless coverage or outdoor wireless coverage within a confined range. Explicit distinction between indoor-serving AP and outdoor-serving base station is made when context may be insufficient to distinguish the utilized terms.

Furthermore, the terms "user," "subscriber," "customer," "consumer," and the like are employed interchangeably throughout the subject specification, unless context warrants particular distinction(s) among the terms. It should be appreciated that such terms can refer to human agent(s) or automated component(s) supported through artificial intelligence (e.g., a capacity to make inference based on complex mathematical formalisms) which can provide simulated vision, sound recognition and so forth.

Further yet, the term "set" as employed herein excludes the empty set. Thus, a "set" in the subject disclosure includes one or more elements or entities. As an illustration, a set of gateway nodes includes one or more gateway nodes; a set of access points includes K access points with K a natural number greater than or equal to unity; a set of backhaul links spans one or more backhaul links; etc. In addition, as employed herein, the term "subset" can include the empty set unless otherwise noted, as in cases in which, for instance, disclosure of a subset of one or more entities is intended to expressly exclude the empty subset.

One or more embodiments of the subject disclosure provide system(s), apparatus(es), and method(s) for providing femtocell service through a secondary connection to a network gateway node that is part of a service provider network. The secondary connection can be established in response to at least one telecommunication performance condition of a primary connection to the network gateway node; the at least one performance condition includes connectivity state of the primary connection (e.g., a backhaul link connection) or quality of traffic delivery (data rate, error rate, etc.) through the primary connection. The secondary connection can be established, at least in part, via a home gateway node that is alternative (e.g., neighboring) to a home gateway node associated with a femtocell access point (AP) that enables, in part, the femtocell wireless service. The main home gateway node of the femtocell AP can initiate establishment of the secondary connection. A home gateway node or a femtocell AP that initiates establishment of the secondary connection can monitor telecommunication performance of the primary connection to the network gateway node. In addition, such home gateway node or such femtocell AP can determine at least one home gateway node that can configure, at least in part, the secondary connection. Home gateway node(s) or femtocell AP(s) that can provide femtocell service through the secondary connection can enable provisioning of at least one of a set of home gateway nodes or a set of femtocell APs. A home gateway node in the set of home gateway nodes or a femtocell AP in the set of femtocell APs is configured to establish, at least in part, the secondary connection. Moreover, the home gateway node(s) or the femtocell AP(s) can manage (add, remove, switch, etc.) connectivity with the network gateway node.

The numerous aspects and features of the subject disclosure provide at least the following advantages with respect to conventional femtocell networks: (i) Improved subscriber experience and associated perceived quality of service. (ii) Reduced subscriber attrition. (iii) Enhanced robustness of telecommunication network design; particularly, though not exclusively, "femtocell to wide area network (WAN)" design. In addition, the numerous aspects or features described herein are superior to solution(s) for always-on femtocell connectivity that relies on connection amongst disparate femtocell access points or connection amongst a wireless device served by a primary femto AP and a secondary femto AP.

Aspects, features, or advantages of the subject disclosure are network and radio technology agnostic, and can be exploited in substantially any network and through most any or any wireless communication technology. For example, Wi-Fi (wireless fidelity), Worldwide Interoperability for Microwave Access (WiMAX); IS-95; Enhanced General Packet Radio Service (Enhanced GPRS); Third Generation Partnership Project (3GPP) Long Term Evolution (LTE); Third Generation Partnership Project 2 (3GPP2) Ultra Mobile Broadband (UMB); 3GPP Universal Mobile Telecommunication System (UMTS); High Speed Packet Access (HSPA); High Speed Downlink Packet Access (HSDPA); High Speed Uplink Packet Access (HSUPA), or LTE Advanced. Additionally, substantially all or all aspects of the subject disclosure can include legacy telecommunication technologies.

While various aspects, features, or advantages of the subject disclosure are illustrated in reference to femtocell (femto) access point(s), such aspects and features also can be exploited in other types of confined-coverage access points (e.g., home-based access point(s), enterprise-based access point(s)) that provide wireless coverage to a confined wireless environment through substantially any or any disparate telecommunication technologies such as, but not limited to, Wi-Fi or picocell telecommunication. Likewise, various aspects, features, or advantages of the subject disclosure are described in connection with a home gateway node. However, such aspects, features, or advantages, can be accomplished for substantially any customer premise equipment (CPE) that serves as a local gateway device or local gateway node for a confined-coverage AP, even though such CPE can be deployed in an enterprise facility (e.g., a factory, an office building . . . ) rather than a home.

Calls referred to and described in the subject disclosure, e.g., incoming calls or call sessions, include voice communications and data communications, such as multimedia communications (video call, text message, audio communication, data communication, etc.). In addition, the various devices referred to and described herein include any communication devices, such as cellphones, wireline telephones, personal computers, portable computers (e.g., netbooks or laptops), personal digital assistants (PDAs), Moving Picture Experts Group (MPEG)-1 Audio Layer 3 (MP3) players, set top boxes, television sets (TVs), stereo players, radio tuners (satellite-signal based or conventional), gaming boxes (set top or portable), digital video recorders (DVRs), or the like.

Features or aspects described in the subject disclosure can rely, at least in part, on delivery or reception of directive(s), indication(s), request(s), or the like, and information or payload data (e.g., content(s)) associated therewith. Directive(s) can be embodied in multi-bit words (e.g., P-bit words, with P a positive integer) and coded to specifically convey a request to a particular functional element (e.g., a femtocell AP) in order to execute one or more specific operation. Information or payload data within signaling, and request(s) or indication(s) conveyed therein, can be embodied, for example, in one or more reserved bits in a packet header, a light-payload (e.g., of the order of 1 byte) data packet, a predetermined multi-bit word conveyed in a control channel, a lightweight file (e.g., a cookie), an email communication, an instant message, or the like. In addition, directive(s), request(s), indication(s), or the like, as described herein, can be delivered in accordance with various communication protocols. As an example, the various protocols can include at least one of file transfer protocol (FTP), secure shell FTP (SFTP), FTP over secure socket layer (FTPS), short message service (SMS) protocol, multimedia messaging service (MMS) protocol, unstructured supplementary service data (USSD) standard, simple network management protocol (SNMP), lightweight directory access protocol (LDAP), session initiation protocol (SIP), SIP for Instant Messaging and Presence Leveraging Extensions (SIMPLE), Open Mobile Alliance (OMA) device management (DM) protocol, Technical Report 069 (TR-069) protocol, also referred to as Customer Premise Equipment (CPE) Wide Area Network (WAN) Management Protocol or CWMP, or the like.

While aspects or features of the subject disclosure are illustrated in terms of applicability to femtocell access points, such aspects and features are also applicable to, and can be exploited in, other radio access points such as Wi-Fi APs, picocell base station, microcell base stations, or the like, which may provide greater radio access capacity.

Various illustrative scenarios are set forth herein to represent example operational environments that exploit one or more features of femtocell service preservation through secondary connections as described herein, and reveal the utility of such one or more features. The various illustrative scenarios are, of course, not exhaustive of the multiple operational environments in which the one or more features described in the subject disclosure can be exploited. In addition, the various illustrative scenarios and related examples are intended to be non-limiting, without restricting the applicability or utility of the various embodiments of systems and methods described herein, or any modification or variations thereof. Various scenarios or embodiments of systems and apparatuses (femtocell AP, home gateway node, etc.) are presented in terms of systems that may include a number of devices, components, modules, and the like. However, it is to be understood and appreciated that the various of the described systems and apparatuses may include additional devices, components, modules, etc., or may not include all of the devices, components, modules, etc., discussed in connection with the annexed drawings. A combination of these approaches to present the various scenarios or embodiments of the subject disclosure also can be used.

With respect to the drawings, FIG. 1 illustrates a schematic deployment of a macrocells and femtocells for wireless service coverage in accordance with aspects of the subject disclosure. In wireless environment 100, two areas 105 represent macrocell (macro) coverage; each macrocell is served by a base station 110, which includes a set of one or more antennas 112 and various equipment or apparatuses 114 that enable operation of the base station 110. It should be appreciated that macrocells 105 are illustrated as hexagons; however, macrocells can adopt other geometries generally dictated by the deployment or floor plan, geographic areas to be covered (e.g., a metropolitan statistical area (MSA) or rural statistical area (RSA)), and so on. Macro coverage is generally intended to serve mobile wireless devices, like UE $120_A$, in primarily outdoor locations. An over-the-air wireless link 115 provides such coverage; the wireless link 115 comprises a downlink (DL) and an uplink (UL), and utilizes a predetermined band of the radio frequency (RF) spectrum. As an example, UE $120_A$ can be a Third Generation Partnership Project (3GPP) Universal Mobile Telecommunication System (UMTS) mobile phone. It is noted that a base station, its associated electronics, circuitry or components, and a wireless link operated in accordance to the base station form a radio access network (RAN). In addition, base station 110 communicates with macro network platform 108 via backhaul link(s) 151 through one or more components (e.g., radio network controller(s), aggregator component(s) . . . ) that are part of access network(s) 152; aspects and deployment of the one or more components are dictated by the underlying radio technology employed for telecommunication. In cellular wireless technologies (e.g., 3rd Generation Partnership Project (3GPP) Universal Mobile Telecommunication System (UMTS), Global System for Mobile Communication (GSM)), macro network platform 108 represents a core network (CN). In an aspect, macro network platform 108 controls a set of base stations 110 that serve either respective cells or a number of sectors within such cells. Macro network platform 108 also communicates with other base stations (not shown) that serve other cells (not shown). Backhaul link(s) 151 can include a wired backbone link (e.g., optical fiber backbone, twisted-pair line, T1/E1 phone line, a digital subscriber line (DSL) either synchronous or asynchronous, an asymmetric ADSL, or a coaxial cable . . . ). Backhaul pipe(s) 155 link disparate base stations 110.

In wireless environment 100, within one or more macrocells 105, a set of femtocells 125 served by respective femtocell (femto) access points (APs) 130 can be deployed; in the subject disclosure, femtocell 125 is also referred to as confined coverage area 125. While in illustrative wireless environment 100 three femtocells are deployed per macrocell, aspects of the subject innovation are geared to femtocell deployments with substantive femto AP density, e.g., $10^4$-$10^8$ femto APs 130 per base stations 110. A femtocell 125 typically covers an area that includes confined area 145, which is determined, at least in part, by transmission power allocated to femto AP 130, path loss, shadowing, and so forth. While coverage area associated with femtocell 125 and confined area 145 typically coincide, it should be appreciated that in certain deployment scenarios, confined coverage area 125 can include an outdoor portion (e.g., a parking lot, a patio deck, a recreation area such as a swimming pool and nearby space) while area 145 spans an enclosed living space or residence space. The coverage area associated with femtocell 125 typically is spanned by a coverage radius, or coverage range, that ranges from 20 to 100 meters. The confined coverage area 125 can encompass a setting that can span about 5000 sq. ft., and can include a residential dwelling, a business space, an entertainment area, a worship area, an educational facility, a wellness area, a hospital, etc., and access to wireless service typically is regulated. In addition or in the alternative, instead of being stationary, the confined coverage area 125 can be mobile; for example, it can be part of a vehicle (a car, an elevator, an aircraft, a vessel, etc.). It should be noted that the confined coverage area is substantially smaller, e.g., 1-3 orders of magnitude smaller, than a macrocell 105.

In the subject disclosure, a confined coverage area, such as confined coverage area 125, embodies a confined wireless environment, which, as indicated supra, can include indoor space, outdoor space, or a combination thereof. In addition, femtocell AP (e.g., 130) or any other type of access point (e.g., Wi-Fi AP, picocell AP) that serves the confined coverage area (e.g., 125) is referred to as confined-coverage AP, to denote that such an AP provides wireless service coverage to a confined wireless environment. Moreover, a confined-coverage AP transmits electromagnetic radiation (e.g., radiates) at lower power than a base station intended for outdoor coverage and that serves a macrocell. In an aspect, an AP (e.g., femtocell AP, picocell, Wi-Fi AP) that serves the confined coverage area (e.g., 125) can be deployed within the indoor space (e.g., within a building or structure) that the AP serves; outdoor space that is part of the confined coverage area (e.g., confined coverage area 125) also is served by the AP. In yet another aspect, an AP that covers the confined coverage area (e.g., 125) can be deployed in the outdoor space that the AP serves; in certain deployments the AP can be mounted on or attached to non-residential structure present in the outdoor space that is part of the confined area. A confined coverage area (e.g., confined coverage area 125) referred to in the subject disclosure is owned or leased by the owner or lessee of the AP that serves the confined coverage area; where the AP is deployed as part of structure (mobile or stationary) within the confined-coverage area.

A femto AP 130 typically serves a few (for example, 1-5) wireless devices (e.g., subscriber station $120_B$) within confined coverage area 125 via a wireless link 135 which encompasses a downlink (DL) and an uplink (UL). A femto network platform 109 can control such service, in addition to mobility handover from macro-to-femto handover and vice versa, and registration and provisioning of femto APs. Control, or management, is facilitated by backhaul link(s) 153 that connect deployed femto APs 130 with femto network platform 109 through one or more components of access network(s) 152. The one or more components can include a network interface device (NID), a gateway node, a digital subscriber line (DSL) access multiplexer (DSLAM), or the like. In addition, the one or more components of access network(s) 152 can be functionally coupled to an access aggregator node, which can be embodied in a broadband remote access server (B-RAS); such aggregator node generally is functionally coupled to a femtocell gateway node (not shown) deployed (e.g., installed, configured, and active) within femto network platform 109. Backhaul pipe(s) 153 are substantially the same as backhaul link(s) 151. In UMTS-based radio technology, backhaul link 150 is embodied, at least in part, in Iuh interface.

In an aspect of the subject innovation, part of the control effected by femto AP 130 is based on measurements of radio link conditions and other performance metrics. Femto network platform 109 also includes components, e.g., nodes, gateways, and interfaces, that facilitates packet-switched (PS) (e.g., internet protocol (IP)) traffic and signaling generation for networked telecommunication. It should be appreciated that femto network platform 109 can be femto AP 130 can integrate seamlessly with substantially any packet switched (PS)-based and circuit switched (CS)-based network such as macro network platform 108. Thus, operation with a wireless device such as $120_A$ is substantially straightforward and seamless when handover from femto-to-macro, or vice versa, takes place. As an example, femto AP 130 can integrate into an existing 3GPP Core Network via conventional interfaces, or reference links, such as Iu-CS, Iu-PS, Gi, or Gn. In addition, femto AP 130 can serve a mobile device that operates in accordance with 3GPP radio technology(ies) without dedicated functionality, such as Wi-Fi transceivers.

It is to be noted that substantially all voice or data active sessions associated with subscribers within femtocell wireless coverage (e.g., confined coverage area 125) are terminated once the femto AP 130 is shut down; in case of data sessions, data can be recovered at least in part through a buffer (e.g., a memory) associated with a femto gateway at the femto network platform. Coverage of a suspended or hotlined subscriber station or associated account can be blocked over the air-interface. However, if a suspended or hotlined customer who owns a femto AP 130 is in Hotline/Suspend status, there is no substantive impact to the customers covered through the subject femto AP 130. In another aspect, femto AP 130 can exploit high-speed downlink packet access either via an interface with macro network platform 108 or through femto network platform 109 in order to accomplish substantive bitrates.

In addition, in yet another aspect, femto AP 130 has cell identifier(s) (e.g., in UMTS-based radio technology, a LAC (location area code) or a RAC (routing area code)) that is different from the underlying macro network. It should be appreciated that in macro networks, cell identifiers (IDs) such as LAC and RAC are reused over several base stations, or Node Bs, and large areas so location information, or intelligence, accuracy and attachment procedure(s) (e.g., Location Area Update (LAU) or Routing Area Update (RAU)) frequency are relatively low. It should be noted that based at least in part on radio technology deployment for macro networks, cell ID reuse granularity may differ, wherein radio technologies with distributed processing and more signaling capacity may afford more granular cell ID (e.g., LAC and RAC) assignments.

Femto LAC and RAC are used to identify subscriber station location for a variety of reasons, most notably to direct incoming voice and data traffic to appropriate paging transmitters, and emergency calls as well. As a subscriber station (e.g., UE $120_A$) that exploits macro coverage (e.g., macrocell 105) enters femto coverage (e.g., confined coverage area 125), the subscriber station (e.g., UE $120_A$) attempts to attach to the femto AP 130 through transmission and reception of attachment signaling. The signaling is effected via DL/UL 135; in an aspect of the subject innovation, the attachment signaling can include a Location Area Update (LAU) or Routing Area Update (RAU). As an example of attachment procedure and mechanism(s) associated therewith, UMTS handsets monitor network pilots, e.g., generated through a femtocell, or femtocell AP, while in the idle mode; each pilot includes LAC and/or RAC. As a subscriber station moves between pilots, e.g., moves within a macro sector and reaches vicinity of a femtocell, the subscriber station probes for a change in LAC or RAC. When a change in LAC or RAC is detected, the subscriber station performs LAU and/or RAU so mobile network(s) becomes aware of subscriber station location in order to properly route incoming call pages. Attachment attempts are thus a part of procedures to ensure mobility, so voice calls and data sessions can be initiated even after a macro-to-femto transition or vice versa.

It is to be noted that UE $120_A$ can be employed seamlessly after either of the foregoing transitions. In addition, femto networks typically are designed to serve stationary or slow-moving traffic with reduced signaling loads compared to macro networks. A service provider network 165 (e.g., an entity that commercializes, deploys, or utilizes femto access points 130 and macro base stations 110) is therefore inclined to minimize unnecessary LAU/RAU signaling activity at substantially any opportunity to do so, and through substantially any available means. It is to be noted that substantially any mitigation of unnecessary attachment signaling/control is advantageous for femtocell, or femtocell AP, operation. Conversely, if not successful, UE $120_A$ is generally commanded (through a variety of communication means) to select another LAC/RAC or enter "emergency calls only" mode. It is to be appreciated that this attempt and handling process can occupy significant UE battery, and femto AP capacity and signaling resources (e.g., communication of pilot sequences) as well.

When an attachment attempt is successful, UE $120_A$ is allowed on femtocell 125, and incoming voice and data traffic are paged and routed to the subscriber through the femto AP 130. To facilitate voice and data routing, and control signaling as well, successful attachment can be recorded in a memory register, e.g., a Visited Location Register (VLR), or substantially any data structure stored in a network memory. It is to be noted also that packet communication (e.g., voice and data traffic, and signaling) typically paged/routed through a backhaul broadband wired network backbone 153 (e.g., optical fiber backbone, twisted-pair line, T1/E1 phone line(s), T3 phone line(s), digital level zero line (DS0), digital subscriber line (DSL) either synchronous or asynchronous, an asymmetric DSL, a coaxial cable . . . ). To this end, femto AP 130 is typically connected to the broadband backhaul network backbone 140 via a broadband modem (not shown). In an aspect of the subject innovation, femto AP 130 can display status indicators for power, active broadband/DSL connection, gateway connection, and generic or specific malfunction. In another aspect, no landline is necessary for femto AP 130 operation.

Figure 2:
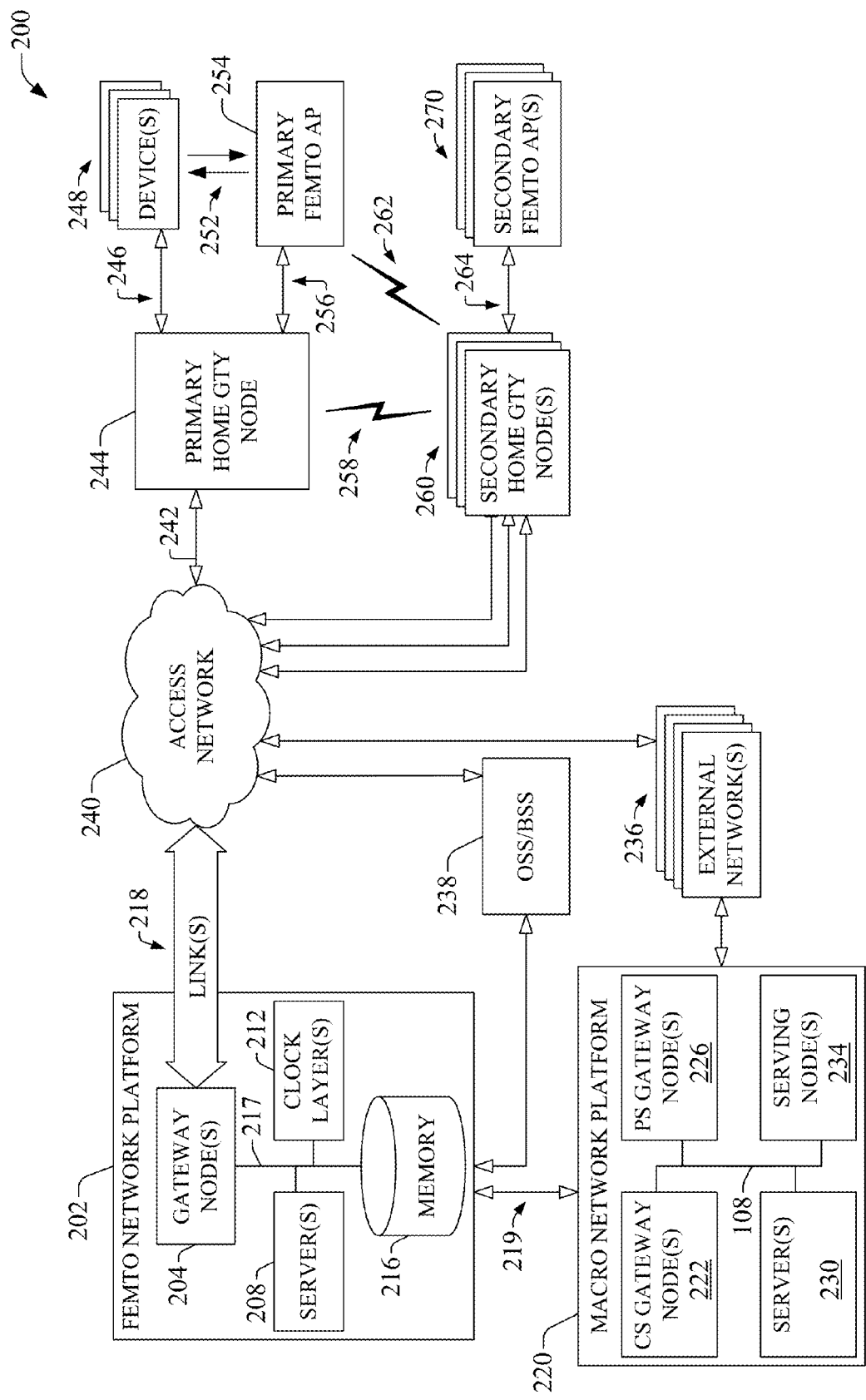
FIG. 2 illustrates an example system that enables and exploits femtocell service through a secondary connection in accordance with aspects described herein.

FIG. 2 illustrates an example system that can enable and exploit femtocell service through a secondary connection in accordance with aspects described herein. In example system 200, femto network platform 202 provides femtocell wireless service. Femto network platform 202 is functionally coupled (e.g., communicatively coupled) to macro network platform 220 via interface 219. In an aspect, interface 219 can be embodied in at least one of conventional link(s) (e.g., a fiber optic link, an Ethernet link, a T1/E1 line . . . ), reference link(s) (e.g., Gi, Gn . . . ), numerous bus architectures, or one or more components of an access network or a core network. Macro network platform 220 provides macrocell wireless service through circuit-switched (CS) domain services and packet-switched (PS) domain services. Macro network platform 220 is directly coupled external network(s) 236.

Femto network platform 202 can serve or exchange traffic and signaling with a mobile device in the set of one or more devices 248 through access network 240, which is linked to the femto network platform 202 via backhaul link(s) 218, and a femtocell (femto) AP (e.g., primary femto AP 254) via a home gateway node (e.g., primary home gateway node 244). Access network 240 is part of access network(s) 152, and the femto AP can operate in accordance with aspects described herein.

Femto network platform 202 includes component(s), node(s), gateway node(s), interface(s), server(s), or platform(s) that enable both packet-switched (PS) communication (e.g. IP-based communication, frame relay communication, ATM communication . . . ) and generation of control signaling for networked wireless communication. In an aspect, femto network platform 202 includes femto gateway node(s) 204, also referred to as gateway node(s) 204, which have substantially the same functionality as PS gateway node(s) 226 in macro network platform 220. A femto gateway node that is part of femto gateway node(s) 204 or a PS gateway node that is part of PS gateway node(s) 226 embodies a network gateway node. Femto gateway node(s) 204 also can include substantially all or all functionality of serving node(s) 234, described below. In an aspect, disparate femto gateway node(s) 204 can control or operate disparate sets of deployed femto APs. The group of femto gateway node(s) 204 can be expanded periodically or in accordance with a schedule to improve management (e.g., load balancing or other aspects of traffic scheduling) and functionality of a set of deployed femto APs. Femto network platform 202 also includes clock layer(s) 212, which can include the clock strata of network time protocol (NTP) and thus supply various time-based utilities and one or more time records.

Server(s) 208 have substantially the same functionality as described in connection with server(s) 230 described below. In an aspect, server(s) 208 can execute multiple application(s) that provide service (e.g., voice and data) to wireless devices served through access network 240 and associated femto AP(s). Server(s) 208 also can provide security features to femto network platform 202. Moreover, server(s) 208 can manage (e.g., schedule, queue, format . . . ) substantially all packetized flows (e.g., IP-based flows, frame-relay-based flows, ATM-based flows . . . ) the server(s) 208 generates in addition to data received, via interface 219 (reference link(s), wireless link(s), various bus architectures, etc.), from macro network platform 220. Furthermore, server(s) 208 can provision, at least in part, femtocell service and exchange signaling, and related payload data, with one or more network components that effect activation of the femtocell service. Further yet, server(s) 208 also implement operations and maintenance (O&M) procedures associated with at least one femto AP and one or more functional elements in femto network platform. In one or more embodiments, server(s) 208 can include one or more processors configured to enable or that enable, at least in part, the functionality of femto network platform 202 or one or more functional elements therein (gateway node(s), clock layer(s), etc.). To that end, the one or more processors in server(s) 208 can execute one or more sets of computer-executable code instructions stored in memory 216, for example. Server(s) 208, or the one or more processors therein, can exchange data and signaling with various functional elements of femto network platform 202 via bus 217. In an aspect, the bus 217 can be embodied in at least one of a memory bus, a system bus, an address bus, a message bus, a power bus, or one or more reference link(s) or interface(s).

Memory 216 also can retain information relevant to operation of the various components of femto network platform 202 and femtocell service provided to one or more subscribers. For example operational information that can be stored in memory 216 can comprise subscriber intelligence, such as physical address(es), billing preference(s) and plan(s), one or more records of incidents; contracted services, which can include media entertainment, gaming, or the like; maintenance and service records related to femtocell service; femtocell configuration, including devices authorized for femtocell service and authorized subscribers (e.g., access control list(s); described hereinafter) associated with one or more deployed (e.g., provisioned and active) femto APs; service policies, such as service priority for a device attached to a deployed femto AP, and equipment specifications; privacy policies; add-on features, which can include parental controls; and so forth. In one or more embodiments, memory 216 can retain one or more access control lists that regulate access to femtocell service from one or more devices in device(s) 248.

Macro network platform 220 can include one or more functional elements, e.g., component(s), node(s), gateway node(s), interface(s), server(s), or platform(s) that enable both packet-switched (PS) (e.g., internet protocol (IP), frame relay, asynchronous transfer mode (ATM)) and circuit-switched (CS) traffic (e.g., voice and data) and control generation for networked communication, wireless or otherwise. It should be appreciated that in cellular wireless technologies (e.g., 3GPP UMTS, HSPA, 3GPP LTE, 3GPP UMTS, 3GPP2 UMB), macro network platform 220 embodies a core network. PS gateway node(s) 226 can embody at least part of the PS domain. Functional element within the PS domain can enable exchange of notifications, indications, and directives in accordance with various networked communication protocols indicated herein, including one or more peer-to-peer transport protocol(s). With respect to CS communication, macro network platform 220 includes CS gateway node(s) 222, which can interface CS traffic received from legacy networks such as telephony network(s) (e.g., public switched telephone network (PSTN), or public land mobile network (PLMN)) or a SS7 network; such networks can be part of external network(s) 236. CS gateway node(s) 222 also can enable exchange of messaging communications in SMS protocol. In addition, CS gateway node(s) 222 can authorize and authenticate traffic (e.g., voice) arising from such networks. Moreover, CS gateway node(s) 222 can access mobility, or roaming, data generated through a SS7 network in response to various mobility events as described herein; for instance, the mobility data can be stored in a VLR (visited location register; not shown). Furthermore, CS gateway node(s) 222 can interface CS-based traffic or signaling with PS gateway node(s) 226. As an example, in a 3GPP UMTS network, CS gateway node(s) 222 can be embodied, at least in part, in gateway GPRS support node(s) (GGSN).

In the subject disclosure, in addition to receiving and processing CS-based traffic and signaling data, PS gateway node(s) 226 can authorize and authenticate PS-based data sessions with device(s) 248 served, in part, through access network 240. Data sessions (e.g., an incoming call) can include traffic exchange with external network(s) 236, which can be interfaced with macro network platform 220 through PS gateway node(s) 226. In an aspect, PS gateway node(s) 226 can generate packet data protocol (PDP) contexts when a data session is established. To at least that end, in an aspect, PS gateway node(s) 226 can include a tunnel interface (e.g., tunnel termination gateway (TTG) in 3GPP UMTS network(s) (not shown)) which can enable packetized communication with disparate wireless network(s), which can be part of access network(s) 240 and can include Wi-Fi networks, femtocell network(s), macrocell network(s) and associated radio access network(s) (RAN(s)) based on various radio technologies, etc.

It should be further appreciated that packetized communication can include multiple flows of data that can be generated through server(s) 230, such as management server(s) (e.g., a provisioning server, a MSC) or application server(s). It is to be noted that in 3GPP UMTS network(s), PS gateway node(s) 226 (e.g., GGSN) and tunnel interface (e.g., TTG) comprise a packet data gateway (PDG).

Serving node(s) 234 can convey various packetized flows of data streams that can be directed to device(s) 248; such flows can be received through PS gateway node(s) 226 from server(s) 230. In an aspect, server(s) 230 can receive the communication(s), such as request for data intended to external network(s) 236, which can include an IMS core or other packet-based cores, from user equipment within device(s) 248 or network elements. As an example, in a 3GPP UMTS network, serving node(s) 234 can be embodied in serving GPRS support node(s) (SGSN). As another example, in a 3GPP LTE network, service node(s) 234 can be embodied in a Mobility Management Entity (MME).

Server(s) 230 can operate in various layers of macro network platform 220 and can execute numerous applications, which can include consumer-oriented application(s), such as messaging services, location services, online gaming, wireless banking, or system-oriented applications, e.g., wireless device management, scheduling or queuing of network traffic, or the like. Such application(s), either consumer-oriented or system-oriented, can generate sets of packetized data streams or flows, and manage (e.g., schedule, queue, format . . . ) such flows. Such application(s), for example can include add-on features to standard services. Data streams generated by server(s) 230 can be conveyed to PS gateway node(s) 226 for authentication/authorization and initiation of a data session and to serving node(s) 234 for communication to device(s) 248 thereafter.

Server(s) 230 also can effect security (e.g., implement one or more firewalls) of macro network platform 220 to ensure network's operation and data integrity in addition to authentication and authorization procedures that CS gateway node(s) 222 and PS gateway node(s) 226 can enact. In addition, server(s) 230 can implement timing protocols (e.g., Network Time Protocol (NTP)) that supply timing framework(s) for various operation(s) of macro network platform 220. Moreover, server(s) 230 can provision services from external network(s) 236 (LAN(s), IMS core network, Global Positioning System (GPS) network(s), or the like). Server(s) 230 can include one or more processors (not shown) configured to provide or that provide, in part, the functionality of macro network platform 220. To that end, the one or more processors can execute one or more sets of computer-executable code instructions (not shown) stored in a memory (not shown) functionally coupled to macro network platform 220, for example.

In the illustrated embodiment of example system 200, femto network platform 202 is functionally coupled to external network(s) 236 indirectly, via macro network platform 220. However, in certain embodiments, femto network platform 220 can be directly connected (e.g., communicatively coupled) to at least one external network in the set of one or more external network(s) 236.

As described supra, femto network platform 202 is functionally coupled to one or more femto access points through access network 240 and link(s) 218. In an aspect, gateway node(s) 204 are functionally coupled (e.g., communicatively coupled) to a primary femto AP 254 via at least one of access network 240 and primary home gateway (gty) node 244. In one or more embodiments, a home gateway node (e.g., 244) is a DSL modem or a cable modem. In alternative or additional embodiments, the home gateway node is a network interface device (NID). In the subject disclosure, a home gateway node is distinguished from a network gateway node in that the home gateway node is embodied in customer premises equipment (CPE) that serves as a data and control gateway to one or more network gateway nodes, whereas the network gateway node is not embodied in CPE. Access network 240 is functionally connected to (i) gateway node(s) 204 via link(s) 218, and (ii) primary home gateway node 244 through link(s) 242. Access network 240 can be part of access network(s) 152; AN 240 can be embodied and can operate in substantially the same manner as an access network that is part of access network(s) 152. Link(s) 218 and link(s) 242 can be embodied and can operated in substantially the same manner as a link in the set of femto backhaul link(s) 153.

Primary home gateway node 244 is functionally coupled to device(s) 248 via link(s) 246. Similarly to other links described supra, link(s) 246 can include wired link(s) or wireless link(s); for example, link(s) 246 can include a point-to-point radio link (e.g., Bluetooth link) or a Wi-Fi radio link. At least a subset of device(s) 248 can be part of a local network deployed within a confined-coverage area associated with (e.g., served by) primary femto AP 254. In an aspect of the subject disclosure, the confined-coverage area served by the primary femto AP or any other femto AP described herein is owned or leased by the owner or lessee of the primary femto AP which can be deployed as part of structure within the confined-coverage area. The confined-coverage area can be embodied in a residential dwelling, such as a single-family home or an apartment; a business space (e.g., a hotel); an enterprise place of operation; a factory; an entertainment area which can include bars, night-clubs, or the like; a worship area such as a church or mosque; an educational facility, which can include open and semi-open spaces as it may be the case in a college campus; a wellness area, e.g., a health club; a hospital or nursing home; etc. Moreover, at least one device amongst device(s) 248 can be served by the primary femto AP 254; for example the at least one device can be a mobile device. Device(s) 248 can include mobile devices (e.g., cellular telephone (cellphone), laptop computer with wireless connectivity card, netbook, DVR . . . ) and wireline devices (e.g., plain old telephone system (POTS) telephone, home manager IP-based telephone . . . ) that utilize wireless network resources to telecommunicate voice or data. In certain embodiments, device(s) 248 can include a wearable device with enabled wireless capability that is attached to the subscriber's garment or gear (goggles, helmet, etc.).

Primary femto AP 254 provides wireless service (e.g., wireless delivery and reception of data and signaling) to the at least one device through, at least in part, wireless links 252; in an aspect, wireless links 252 are substantially the same as wireless links 135, and thus wireless links 252 include an UL and a DL. In addition, to provide wireless service, at least in part, primary femto AP 254 communicates with primary home gateway node 244 through link(s) 256; in one or more embodiments, link(s) 256 is embodied in a single wired link functionally attached to primary home gateway node 244. To provide wireless service, primary femto AP 254 exploits primary home gateway node 244 to establish a telecommunication channel (a packet-based protocol channel, such as a virtual private network (VPN) channel, for example) to gateway nodes(s) 204 via links 218 and 242, and AN 240. Wireless traffic and signaling is exchanged with CS core or PS core in macro network platform 220. It is noted that a femto AP (primary or secondary) exploits an associated home gateway node to establish such telecommunication channel (e.g., VPN channel). The telecommunication channel is typically persistent and thus it should be maintained functional for a femto AP, and related wireless devices, to access to femtocell service. In scenario(s) in which performance of telecommunication channel established by primary femto AP 254 with gateway node(s) 204 is compromised—e.g., connectivity to or from gateway node(s) 204 is lost or bandwidth available for traffic prevents acceptable performance of a service provided through the primary femto AP 254—example system 200 enables preservation of femtocell wireless service within suitable perceived quality of service.

Preservation of femtocell wireless service is based at least in part on a secondary connection to femto network platform 202. The secondary connection is enabled, at least in part, via at least one secondary home gateway that is part of the set of one or more secondary home gateway node(s) 260. A secondary home gateway node in the set of one or more secondary home gateway node(s) 260 is functionally coupled (e.g., communicatively coupled) to at least one femto AP (e.g., a secondary femto AP) in the set of one or more secondary femto AP(s) 270 via link(s) 264. In one or more embodiments, link(s) 264 is a single wired link functionally connected to the secondary home gateway node. The secondary home gateway node is associated with a confined-coverage area. As indicated supra, the confined-coverage area can be embodied in a residential dwelling, such as a single-family home or an apartment; a business space (e.g., a hotel); an enterprise place of operation; a factory; an entertainment area which can include bars, night-clubs, or the like; a worship area such as a church or mosque; an educational facility, which can include open and semi-open spaces as it may be the case in a college campus; a wellness area, e.g., a health club; a hospital or nursing home; etc.

The secondary connection can be established in accordance with numerous embodiments. In a first example embodiment of example system 200, a femto AP (e.g., primary femto AP 254) connects to a home gateway node (e.g., a secondary home gateway node in the set of one or more secondary home gateway node(s) 260) associated with a confined-coverage area disparate from the confined-coverage area associated with the femto AP. In such first embodiment, establishment of the secondary connection can be effected in response to numerous communication performance deficiencies that comprise connectivity of the femto AP (e.g., primary femto AP 254) with a gateway node. Communication performance deficiencies can include loss of backhaul link connectivity (e.g., broadband connectivity, such as DSL connectivity), traffic degradation, malfunction of the home gateway node (e.g., primary home gateway node 244) linked to the confined-coverage area associated with the femto AP (e.g., primary femto AP 254), or other adverse network event(s). In an aspect of the first embodiment, the femto AP that establishes, in part, the secondary connection, can operate in at least one radio technology in addition to the radio technology employed by the femto AP for communication of traffic and signaling that is part of femtocell wireless service. Radio technology protocol employed for communication via links 262 can be different from the radio technology protocol employed for communication via wireless links 252. The complexity of affording more than one radio technology can be offset by the benefit(s) of retaining femtocell wireless service in the presence of a plurality of communication performance deficiencies. In addition, such first embodiment has at least the advantage of avoiding changes to femtocell deployment architecture (e.g., deployment plan), and thus preserving information critical to operation and regulation of femtocell service, such as validated addresses of femto APs for enhanced 911 (E911) service.

In a second example embodiment of example system 200, a first home gateway node (e.g., primary home gateway node 244) connects to a second home gateway node (e.g., a secondary home gateway node in the set of one or more secondary home gateway node(s) 260) and establishes a secondary telecommunication channel with the second gateway node. In an aspect of such example second embodiment, the first home gateway node and the second home gateway node can establish the secondary telecommunication channel wirelessly via radio links 258. In an aspect, radio links 258 can be implemented in accordance with various radio technology protocols (Wi-Fi, 3GPP UMTS, 3GPP LTE, etc.). In such second example embodiment, complexity of a femto AP connected to a home gateway node (e.g., primary home gateway node 244) is reduced with respect to a femto AP (e.g., primary femto AP 254) in the first example embodiment. It should be appreciated that in the second example embodiment, a potential tradeoff of reduced complexity may be reduced scope of communication performance deficiencies that can be mitigated via the plurality of home gateway nodes; for instance, a malfunctioning home gateway node may not be able to implement a secondary telecommunication channel. It should be further appreciated that such second example embodiment has at least the advantage of maintaining deployment architecture of backhaul links that enable coupling of one or more home gateway nodes with femto network platform 202.

Figure 3:
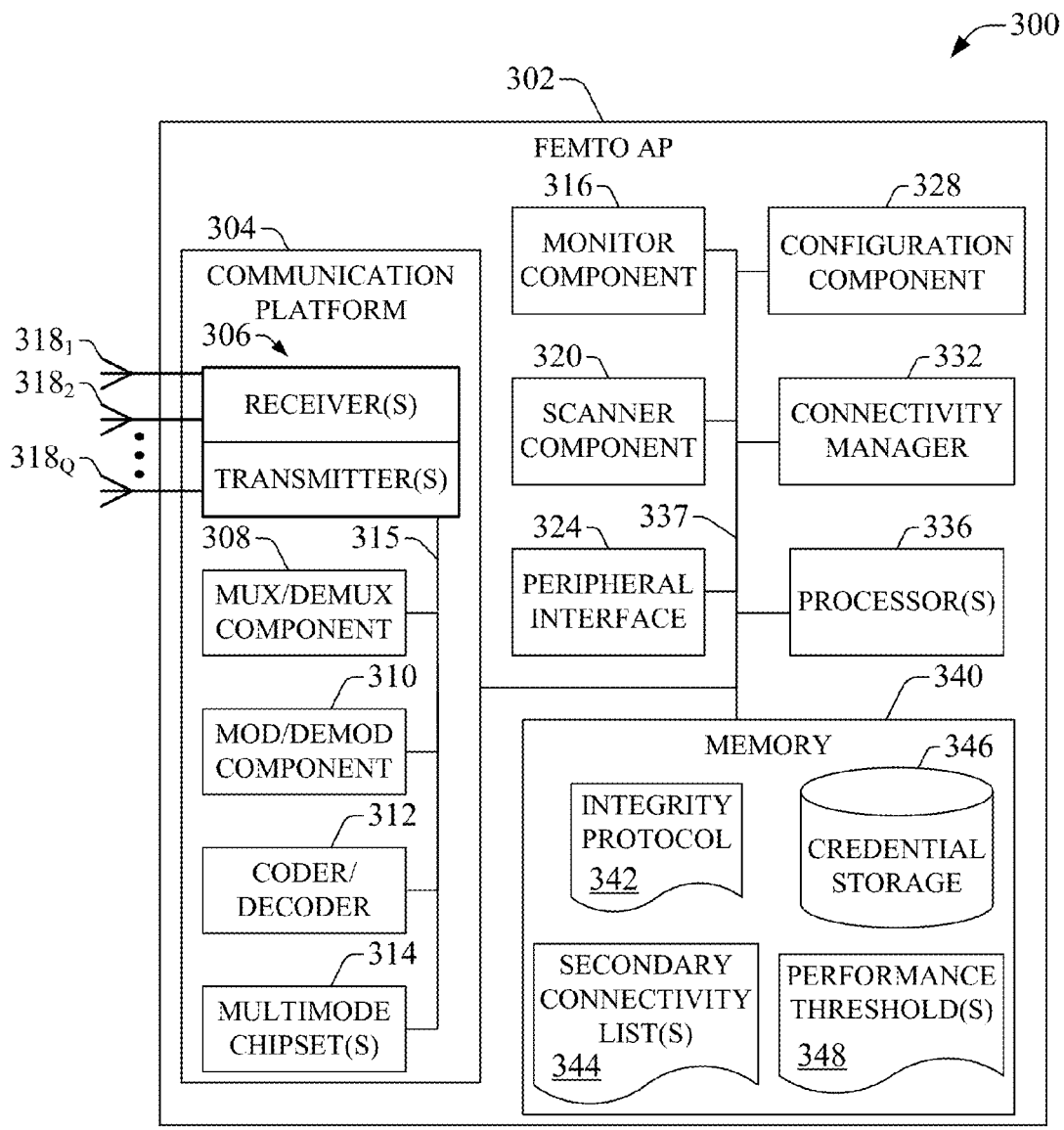
FIG. 3 illustrates an example embodiment of a femtocell AP that can retain femtocell wireless service in accordance with aspects disclosed herein.

FIG. 3 illustrates an example embodiment 300 of a femto AP that can retain femtocell wireless service in accordance with aspects disclosed herein. Femto AP 302 can embody one or more femtocell APs (e.g., primary femto AP 254 or a secondary femto AP within secondary femto AP(s) 270) or any other confined-coverage AP referred to and described herein. To enable wireless service, femto AP 302 includes communication platform 304. Communication platform 304 comprises a set of receiver(s)/transceiver(s) 306. While each transceiver in the set includes an antenna $318_\kappa$, with $\kappa=1, 2, \ldots Q$, with Q a natural number greater or equal than unity. In the subject disclosure, the set of receiver(s)/transceiver(s) 306 can transmit and receive signal via a peripheral interface 324 and antennas $318_\kappa$. The peripheral interface 324 is functionally connected to a home gateway node (not shown; e.g., primary home gateway node 244) that serves as primary home gateway node for femto AP 302. In an aspect, connection of peripheral interface 324 (e.g., via an Ethernet port therein) to the home gateway node that serves as primary home gateway node for femto AP 302 can lead the femto AP 302 to establish automatically a packet-based protocol tunnel (e.g., a VPN tunnel) with a network gateway node (e.g., a gateway node in gateway node(s) 204). In another aspect, peripheral interface 324 enables connection to a peripheral device and communication therewith. As an example, peripheral interface 324 can allow connection of an external antenna to receive global navigation data, e.g., global positioning system (GPS) data; the antenna can reside in an outer location of a confined area served by femto AP 302, so the antenna is exposed to open sky. As another example, peripheral interface 324 can enable connection of femto AP 302 to disparate femto AP(s). Peripheral interface 324 can include a set of ports, which comprises at least one of parallel port(s), serial port(s), Ethernet port(s), V.35 ports, X.21 ports, wherein parallel ports can comprise General Purpose Interface Bus (GPIB), IEEE-1284, while serial ports can include Recommended Standard (RS)-232, V.11, Universal Serial Bus (USB), FireWire or IEEE-1394.

Communication platform 304 comprises electronic components and associated circuitry that enable processing and manipulation, e.g., coding/decoding, deciphering, modulation/demodulation, of signal(s) received by femto AP 302 and signal(s) to be transmitted by femto AP 302; received or transmitted signal(s) are modulated and coded, or otherwise processed, in accordance with various radio technology protocols (e.g., 3GPP UMTS, 3GPP LTE . . . ). Components, or functional elements, in communication platform 304 exchange information through a bus 315; information includes data, code instructions, signaling and related payload data, or the like, and the bus 315 can be embodied in at least one of a system bus, and address bus, a data bus, a message bus, or a reference link or interface. The electronic components and circuitry can include the set of Q receiver(s)/transmitter(s) 306 and component(s) therein, a multiplexer/demultiplexer (mux/demux) component 308, a modulator/demodulator component 310, a coder/decoder 312, and a set of one or more chipsets, e.g., multi-mode chipset(s) 314. Receiver(s)/transmitter(s) 306 can convert signal from analog to digital and vice versa. In addition, receiver(s)/transmitter(s) 306 can divide a single data stream into multiple parallel data streams, or perform the reciprocal operation; such operations are typically conducted in various multiplexing schemes. Functionally coupled to receiver(s)/transmitter(s) 306 is a multiplexer/demultiplexer (mux/demux) component 308 that enables processing or manipulation of signal(s) in time and frequency space or domain. Electronic mux/demux component 308 can multiplex and demultiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 308 can scramble and spread information (e.g., codes) according to substantially any code; e.g., Hadamard-Walsh codes, Baker codes, Kasami codes, polyphase codes, and so on. A modulator/demodulator (mod/demod) component 310 also is a part of communication platform 304, and can modulate and demodulate information according to various modulation techniques, such as frequency modulation (e.g., frequency-shift keying), amplitude modulation (e.g., M-ary quadrature amplitude modulation (QAM), with M a positive integer; amplitude-shift keying (ASK)), phase-shift keying (PSK), and the like. In embodiment 300, mod/demod component 310 is functionally coupled to mux/demux component 308 via bus 315. In addition, processor(s) 340 enables, at least in part, femto AP 302 to process data (e.g., symbols, bits, or chips) for multiplexing/demultiplexing, modulation/demodulation, such as implementing direct and inverse fast Fourier transforms, selection of modulation rates, selection of data packet formats, inter-packet times, etc.

Communication platform 304 also includes a coder/decoder 312 that operates on data in accordance with one or more coding/decoding schemes suitable for communication, at least in part, through one or more receivers(s)/transmitter(s) 306. In an aspect, the coding/decoding schemes, or related procedures, can be retained as a group of one or more code instructions in memory 340. When telecommunication through one or more transmission point(s) (not shown) associated with femto AP exploits multiple-input multiple-output (MIMO), multiple-input single-output (MISO), single-input multiple-output (SIMO) or single-input single-output (SISO) operation, coder/decoder 312 can implement at least one of space-time block coding (STBC) and associated decoding; or space-frequency block (SFBC) coding and associated decoding. Coder/decoder 312 also can extract information from data streams coded in accordance with spatial multiplexing scheme. To decode received information, e.g., data or control, coder/decoder 312 can effect at least one of computation of log-likelihood ratios (LLR) associated with constellation realization for a specific demodulation; maximal ratio combining (MRC) filtering, maximum-likelihood (ML) detection, successive interference cancellation (SIC) detection, zero forcing (ZF) and minimum mean square error estimation (MMSE) detection, or the like. In addition, to operate in the manner described herein, coder/decoder 312 can employ, at least in part, mux/demux component 308 and mod/demod component 310.

In addition, communication platform 304 can process (code, decode, format, etc.) signal(s) originated in a wireless environment within a set of one or more electromagnetic (EM) radiation frequency bands, also referred to as frequency bands in the subject specification. The set of EM frequency bands can comprise radio frequency (RF) portion(s) and microwave portion(s) of the EM spectrum, although other spectral regions such as infrared (IR) also can be included. In addition, in one aspect, the set of EM radiation frequency bands can include at least one of (i) all or substantially all licensed EM frequency bands, or (ii) all or substantially all unlicensed frequency bands currently available for telecommunication. It is noted that the set is configurable and can be upgraded to incorporate frequency bands, or frequency carriers therein, as such bands or carriers become available for telecommunication, e.g., auctioned for utilization or authorized for free-of-charge utilization. In an embodiment, a server (e.g., provisioning server that is part of OSS/BSS 238 can enable configuration of the set of EM frequency bands. Communication platform 304 also can operate in accordance with a configurable set of radio technologies, or communication protocols thereof; procedures that when executed, for example, by a processor, implement such communication protocols can be retained in memory 340. As new radio technologies become standardized, or available, a network operator that provides telecommunication service via femtocell network can introduce such technologies in the set of radio technologies that can be utilized for telecommunication through a femto AP 302 deployed in a confined area.

In example embodiment 300, multimode chipset(s) 314 can enable femto AP 302 to operate in multiple communication modes through various radio network technologies (e.g., second generation (2G), third generation (3G), fourth generation (4G)) or deep-space satellite-based communication in accordance with disparate technical specifications, or standard protocols, for the radio network technologies or satellite communication. The various radio network technologies can be part of the set of radio technologies described supra. In an aspect, multimode chipset(s) 314 can enable, at least in part, communication platform 304 to operate in accordance with standard protocols specific to a telecommunication mode of operation, e.g., Long Term Evolution (LTE)-based communication. In another aspect, multimode chipset(s) 314 can be scheduled to operate concurrently in various modes or within a multitask paradigm in which the multimode chipset(s) 314 operates in a dedicated mode for a specific time interval.

Femto AP 302 also can include a display interface (not shown), which can render various indicia associated with functions that control operation of femto AP 302 or reveal operation conditions thereof, e.g., available connectivity to backhaul broadband network. In addition, the display interface (not shown) can convey information to an end user, such as number of currently served mobile devices. Moreover, the display interface (not shown) can receive one or more directives to render an environment (e.g., display a user interface) to configure at least one routing preference associated with customized communication routing as described herein. In an aspect, the one or more directives can be issued (e.g., generated and delivered) by configuration component 328.

The display interface (not shown) can include a display component (not shown) that can convey visual or aural indicia. Various schemes can be employed to render the environment to configure the routing preference, such as, but not limited to, windows-based schemes, e.g., iconic representation, pop-up representation; or text-based representation, with scroll-down or scroll-sideways delivery, or static rendering. In an aspect, based on complexity of femto AP 302, for example, the display component (not shown) can be embodied, at least in part, in a display element within a monitor such as a cathode ray tube (CRT) monitor, a Liquid Crystal Display (LCD) monitor, a plasma monitor, a light emitting diode (LED) monitor, an electrochromic monitor, or the like. The display component (not shown) also can enable communication of aural indicia, for example, via speaker(s).

The display interface (not shown) can enable entry of data that defines one or more routing preferences in the set of routing preferences. In addition, the display interface (not shown) can collect entry of data, through a data entry component (not shown) that can enable femto AP 302 to receive external commands (e.g., restart operation) or configuration information (e.g., edit access control list(s) within femto AP 302 or in administration component within a core network). The display interface (not shown) can process (e.g., decode/code), at least in part, received input data and convey it as signaling to one or more functional elements (component(s), platform(s), etc.) or memory 340 within femto AP 302. To mitigate fraudulent transaction(s), entry of data can be secured through various credential-based mechanisms, such as password protection, biometric protection, or the like, and an associated secured transport protocol(s) that can include data encryption. In an aspect, one or more sets of code instructions that can be executed to implement such mechanisms can be retained within an application (app.) storage (not shown).

Various functional elements and associated circuitry that can embody, at least in part, data entry component (not shown) enable data input through one or more gestures (e.g., touch, speech, motion), one or more communication protocols. Such functional elements can include a keypad, a touch screen, a microphone, a camera(s); a bar code reader, radio frequency ID (RFID) reader, infrared (IR) wireless-based reader; or the like.

In certain embodiments, femto AP 302 can include a power supply (not shown), which can provide power to one or more components or functional elements that operate within femto AP 302. In an aspect, the power supply (not shown) can be rechargeable, e.g., it can be embodied in a rechargeable battery. In addition, the power supply (not shown) can include one or more transformers to achieve power level(s) that can operate femto AP 302 and component(s) or functional element(s), and related circuitry therein. In an aspect, the power supply (not shown) can attach to a conventional power grid to recharge, or ensure femto AP 302 is operational; the power supply (not shown) can include input/output (I/O) interface(s) (not shown), or connector(s) (not shown), to functionally attach to the conventional power grid. The power supply (not shown) also can include an energy conversion component(s) (not shown) such as a solar panel or a thermoelectric device or material, which can be external or internal to the femto AP 302, in order to provide additional or alternative power resources or autonomy to femto AP 302.

Femto AP 302 includes a monitor component 316 that can evaluate performance of a telecommunication channel established by femto AP 310 with a gateway node (not shown). In an aspect, monitor component 316 evaluates such performance by determining at least one performance condition of a home gateway node to which femto AP 302 is functionally connected and that enables, in part, communication with the gateway node, and comparing the at least one condition with group of performance threshold. A performance condition can be characterized by a key performance indicator (KPI), such as rate of data packet loss, rate of call session loss, time interval for call session establishment, data rate, or the like. The performance threshold can be retained as part of performance threshold(s) 348, which is a memory element (register, database, file, etc.) within memory 340. The at least one condition of the home gateway node determines the condition of a backhaul link connection. In another aspect, monitor component 316 evaluates performance of the telecommunication channel by assessing one or more performance conditions of a packet-based protocol tunnel (e.g., a VPN tunnel) and comparing the one or more performance conditions to a set of performance thresholds. The set of performance thresholds can be part of performance threshold(s) 348.

Based on the performance of the telecommunication channel, e.g., the performance is below a predetermined threshold, monitor component 316 can convey an indication to scanner component 320 to detect a set of home gateway nodes, wherein each home gateway node in such set is not functionally connected (e.g., functionally attached through a conductor) to femto AP 310. The set of home gateway nodes can be deployed (e.g., installed, configured, tested, and commissioned) in proximity (e.g., adjacent) to femto AP 310. In one or more scenarios, femto AP 310 embodies primary femto AP 254 and secondary home gateway node(s) 260 embody the set of home gateway nodes.

A subset of one or more home gateway nodes in the set of home gateway nodes detected by scanner component 320 can be provisioned by a network server (e.g., a provisioning server within OSS/BSS 238). In an aspect, the set of home gateway nodes can be provisioned at the time of or after initial installation of femto AP 302. As part of the provision of such home gateway nodes, the network server can commit (e.g., deliver and cause to store) one or more secondary connectivity list(s), and a set of security credentials (e.g., encrypted authentication passcodes, encryption keys, digital certificates . . . ) associated with the subset of home gateway nodes. The one or more secondary connectivity list(s) can be retained in memory 340 within memory element (register, file, database, etc.) 344. Likewise, the set of security credentials can be retained in credential storage 346 within memory 340. Configuration component 328 enables a service provider, or network operator, to provision the subset of one or more home gateway nodes. In an aspect, configuration component 328 can receive at least one of the secondary connectivity list(s) or the set of credentials and store either the secondary connectivity list(s) or the set of credentials, or both, within memory 340. Credential storage 346 also can retain onme or more hardware identifying tokens or codes; for example, an IMSI, a temporary international mobile subscriber identity (TIMSI), packet TIMSI (P-TIMSI), an IMEI, an MDN, a MIN, a TIA ESN, or a multi-bit identification number such as MEID.

To detect a home gateway node, scanner component 320 can collect wireless pilot signal conveyed (e.g., broadcasted) by the home gateway node; communication platform 304 enables, in part, collection of the wireless pilot signal. To collect the wireless pilot signal, the scanner component 320 can exploit communication platform 304, or one or more components therein, to receive wireless signal within a specific portion of the EM spectrum and in accordance with a specific radio technology protocol (e.g., Wi-Fi communication). Scanner component 320 can convey an indication to communication platform 304, or the one or more components therein, to decode wireless signal in the specific portion of the EM spectrum and the specific radio technology. If a signal quality metric (signal-to-noise ratio (SNR), signal-to-interference-and-noise ratio (SINR), etc.) associated with the wireless pilot signal is above a predetermined threshold, scanner component 320 extracts an identification (ID) code of the home gateway node and thus identifies it. Upon or after detection of a home gateway node, scanner component 320 determines if the home gateway node is part of a secondary connectivity list. To make such determination, scanner component 320 or a component therein (not shown) can compare the ID code with one or more codes in the secondary connectivity list. In case the home gateway node is not part of the secondary connectivity list, scanner component 320 proceeds with detection of an additional home gateway node. In the alternative, in case the home gateway node is listed in the secondary connectivity list, scanner component 320 determines if the home gateway node is available to establish a wireless secondary telecommunication channel, such as a wireless packet-based protocol tunnel. In an aspect, to determine such availability, scanner component 320 can convey a request for service to the home gateway node. In response, scanner component 320 can receive an acknowledgement (ACK) signal in case the home gateway node has radio resources (e.g., available bandwidth) to enable the wireless telecommunication channel. Conversely, if the home gateway node is unable to establish the wireless telecommunication channel, scanner component 320 can receive a no-acknowledgement (NACK) signal or any other type of rejection indication. The home gateway node can reject the request for service based at least on (a) current or nearly-current usage of radio resources or processing resources, or (b) an access list that determines a group of femtocell APs allowed to establish the wireless secondary telecommunication channel.

For a detected home gateway node that is determined to be available, scanner component 320 or a component therein (not shown) can attach to such home gateway node and establish a wireless connection (e.g., a Wi-Fi connection) amongst femto AP 302 and the detected home gateway node. In an aspect, establishment of such wireless connection includes mutual authentication of the femto AP 302 and the detected home gateway node; the mutual authentication exploits at least one security credential retained in credential storage 346. In an aspect, since the wireless connection may not be as reliable as a wired connection, monitor component 316 can assess quality (packet loss rate, block error rate, etc.) of the wireless connection and, in response to unsuitable quality (e.g., below a predetermined threshold), scanner component 320 can detect an alternative home gateway node.

Upon or after establishment of the wireless connection, femto AP 302 requests the detected and available home gateway node to configure a packet-based protocol tunnel amongst the femto AP 302 and a gateway node in order to retain, or continue, femtocell wireless service through femto AP 302. In an aspect, connectivity manager component 332, also referred to as connectivity manager 332 in the subject specification an annexed drawings, can enable femto AP 302 to convey a request to configure the packet-based protocol tunnel (e.g., VPN tunnel, such as IPSec tunnel or GPRS tunnel); the request is delivered, in part, via communication platform 304. In another aspect, connectivity manager 332 can switch from a first packet-based protocol tunnel (e.g., VPN tunnel) established through a first home gateway node (e.g., primary femto AP 254) to a second packet-based protocol tunnel (e.g., VPN tunnel) established through a second home gateway node (e.g., a home gateway node in secondary home gateway node(s) 260). Thus, connectivity manager 332 enables femto AP 302 to switch to a telecommunication channel established via the home gateway node that scanner component 320 detected and determined to be available. In another aspect, for a specific communication performance condition, connectivity manager 332 can retain more than one packet-based protocol tunnel (e.g., VPN tunnel) simultaneously or nearly simultaneously. Monitor component 316 can determine the specific communication performance condition and can report it to connectivity manager 332. For instance, the specific communication performance condition can be insufficient bandwidth to attain a requisite or preferred data rate for certain service (e.g., networked gaming application or video streaming application) provided through femto AP 302 via a first telecommunication channel; thus, implementation of a second telecommunication channel in addition to the first telecommunication channel can be necessary or preferred. Integrity protocol 342 retained in memory 340 can dictate, at least in part, whether the second telecommunication channel is necessary (e.g., service with guaranteed bit rate) or preferred.

Femto AP 302 includes processor(s) 336 that can be configured to enable or that enable, at least in part, functionality to substantially any or any component(s), platform(s), interface(s), node(s), and so forth, within femto AP 302 in accordance with one or more aspects of the described operation of femto AP 302. Processor(s) 336 is functionally coupled to each functional element within femto AP 302 and to memory 340 through bus 337; the bus 337 can be embodied in at least one of a memory bus, a system bus, an address bus, a message bus, a power bus, or one or more reference link(s) or interface(s). In embodiment 300, processor(s) 336 is illustrated as external to the various functional elements (e.g., component(s), interface(s), platform(s), node(s)) of femto AP 302; however, in additional or alternative embodiment(s), processor(s) 336 can be distributed amongst a plurality of such functional elements. In some embodiment(s), one or more functional elements that comprise femto AP 302 can reside within memory 340 as one or more sets of code instructions that, when executed by processor(s) 336, implement the various functional elements and described functionality thereof.

Processor(s) 336 also can supply information to and retrieve information from memory 340. Such information can enable, at least in part, operation of or can provide, at least in part, functionality to communication platform 304, and at least a portion of functional elements therein; display interface and functional element(s) therein; as well as other operational components (not shown) of femto AP 302. The information can include at least one of code instructions, code structure(s), data structures, or the like.

Processor(s) 336 can execute computer-executable code instructions stored in memory 340, for example within application storage (not shown), or other memory(ies) functionally coupled to femto AP 302, to provide, at least in part, the described functionality of femto AP 302. Such computer-executable code instructions can include program modules or software applications or firmware applications that implement various methods described in the subject specification and associated, at least in part, with functionality or operation of femto AP 302.

Memory 340 also can retain, at least in part in the foregoing application storage (not shown), at least one of data structures (e.g., objects, classes, metadata); code structure(s) (e.g., modules, procedures) or code instructions; or substantially any type of software application(s) or firmware application(s) that processor(s) 336 can execute to enable, at least in part, functionality associated with substantially any or any component(s), platform(s), interface(s), or functional element(s) within femto AP 302 in accordance with aspects described herein. In addition, memory 340 can store network or device information, e.g., within data storage (not shown), such as one or more communication protocol(s) or technical specification(s); code sequences for scrambling or spreading; blind decoding hypotheses; semi-persistent scheduling parameters; frequency offsets, macrocell base station identifiers and femtocell AP identifiers (IDs); address book(s); or the like. Moreover, memory 340 can retain content(s) such as multimedia files or subscriber-generated data. Memory 340 can include affixed or removable elements such as a subscriber identification module (SIM) card storage, a universal integrated circuit card (UICC) storage, or a removable user identity module (RUIM). In one or more embodiments, at least a portion of memory 340 and content thereof can be external to femto AP 302 and linked thereto via a peripheral interface.

Memory 340 also includes access control list(s) (not shown), which can be employed at least to configure default logic for customized routing of an incoming call, as discussed supra. An access control list (ACL) enables, at least in part, regulation of access to wireless service supplied through femto AP 302 and features of supplied wireless service. To at least that end, an ACL can comprise a set of access attributes, which identify devices that can communicate wirelessly and are authorized to receive telecommunication service through femto AP 302. An access attribute uniquely identifies a device.

An access control list (ACL) associated with a femto AP can enable regulation of access thereto in at least the following manner. If a femto AP, e.g., primary femto AP 254, receives attachment signaling (e.g., LAU signaling or RAU signaling in UMTS-based radio technology) originated by a device, e.g., a mobile in device(s) 248, the femtocell AP validates an identity of the device, as conveyed in the attachment signaling, against the access control list, e.g., ACL(s), associated with the femtocell AP. If the identity of the device matches a device identifier in the ACL, the attachment procedure associated with received attachment signaling is completed and the femtocell AP allows the device to camp therein and establish call sessions normally. In the alternative, if validation against the ACL results in no match amongst the identity of the device and a device identity retained in the ACL, the femtocell AP rejects the attachment signaling and the device is allowed only to establish emergency calls. An owner or lessee of a femtocell AP can determine access attributes to be recorded in or removed from an access control list associated with the femtocell AP.

More than one ACL can be retained in memory 340; however, a single ACL can be active at a time in order to regulate access and provide wireless services. Memory 340 also can retain service attributes that control logic for provision of service to a wireless device identified in an ACL. Service attributes can be specific to femto AP 302. The logic for provision of service can establish at least one of the following features: (i) Supplied service(s), e.g., voice-only service, data-only service and available applications, voice and data service and provided applications associated with the service(s). In addition, radio technology employed to supply service(s) also can be set. (ii) Service priority, e.g., ranking of access to radio resources such as radio technology (3G or 4G), bandwidth, dedicated channels. (iii) Access schedule or time constraints, such as time of day considerations, or expected duration of provided service. (iv) Level of service or access quality of service, e.g., quality of service (QoS) profile such as best effort, conversational, real-time. It should be appreciated that service attributes also can determine other service features.

A configuration of service attributes, also referred to as a profile of service attributes or access profile, is specific to a mobile device identified in an access control list, even though it should be noted that a particular configuration of service attributes can display a one-to-many relationship with identified devices in an ACL. Accordingly, specification of a service attribute profile can customize provision of wireless service through a femto AP 302.

Figure 4:
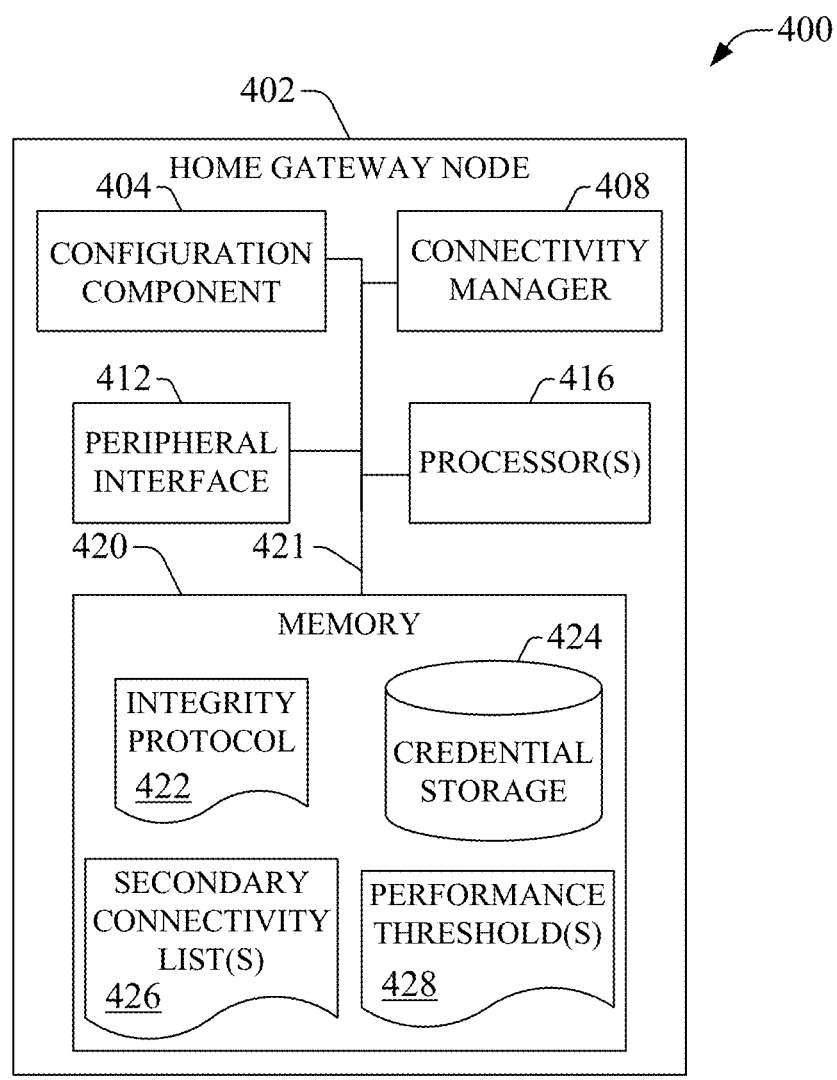
FIGS. 4-5 illustrate example embodiments of a home gateway node that enables retention of femtocell wireless service in accordance with aspects of the subject disclosure.

FIG. 4 illustrates an example embodiment 400 of a home gateway node that can enable retention of femtocell wireless service in accordance with aspects of the subject disclosure. Home gateway node 402 can embody one or more home gateway nodes (e.g., primary home gateway node 244 or a secondary home gateway node within secondary home gateway nodes 260) described herein. In an aspect, home gateway node 402 can embody a home gateway node that is detected by a femtocell AP as part of implementation of an integrity protocol to retain femtocell wireless service in accordance with aspects disclosed herein. In a scenario in which home gateway node 402 is available to establish a wireless telecommunication channel with the femtocell AP.

Configuration component 404 operates in substantially the same manner as configuration component 328. In an aspect, configuration component 404 enables a network server (e.g., a provisioning server within OSS/BSS 238) to provision a set of femto APs and associated security credentials; a service carrier manages (e.g., owns or leases, and operates) the network server. As part of provision of such set, configuration component 404 can receive identification codes or tokens for at least one femto AP in the set; ID code(s) or token(s) can be retained in secondary connectivity list(s) 426. In addition, configuration component 404 can retain security credentials associated with the set of femto APs in credential storage 424. As described supra, the security credentials enable authentication of home gateway node 403 with a femto AP and vice versa. In one or more embodiments, the set of security credentials includes at least one encryption key, at least one encrypted authentication passcode, or the like. Integrity protocol 422 can include one or more protocols (Kerberos, RADIUS, Diameter, LDAP, etc.) that enable such authentication.

Based on availability conditions, home gateway node 402 can establish a wireless connection with a femto AP in the set of provisioned femto APs in order to maintain femtocell wireless service through the femto AP. In an aspect, connectivity manager 408 can assess an availability condition and determine if home gate node can establish a wireless connection (e.g., Wi-Fi wireless connection) to the femto AP. As an example, the availability condition can be an amount of radio resources (scheduled traffic, bandwidth, channels, etc.) or processing resources (scheduled tasks, processor load, available memory, etc.) available to home gateway node 402 for usage. In a scenario in which such availability condition is above a predetermined threshold, connectivity manager 408 categorizes home gateway node 402 as available to establish the wireless connection to the femto AP. At least one predetermined threshold(s) can be retained in a memory element (register, database, file, etc.), such as performance threshold(s) 428. As another example, an availability condition can be the output of a formal operation, such as a logical operation or query, that determines if an ID code or token of the femto AP is part of secondary connectivity list(s) 426; processor(s) 424 can execute the formal operation. In a scenario in which the outcome of the formal operation indicates the ID code or token identifies a femto AP that is authorized to establish a wireless connection to home gateway node 402, connectivity manager 408 classifies home gateway node 402 as available. Connectivity manager 408 deliver (e.g, broadcast, multicast, or unicast) an indication that home gateway node 402 is either available or not available to establish a wireless connection with a femto AP. In another aspect, when home gateway node 402 is available to establish a wireless connection, connectivity manager component 408 can establish such wireless connection, wherein the wireless connection can include a packet-based protocol tunnel (e.g., VPN tunnel based on one of IPSec protocol or GPRS Tunnel Protocol).

Home gateway node 402 can communicate wirelessly through a communication platform (not shown) and respective antenna(s) (not shown), that operates in substantially the same manner as communication platform 304. The communication platform (not shown) in home gateway node 402 includes at least the same functional elements (components, antennas, mod/demod, coder/decoder, multimode chipset(s), etc.) as the communication platform 304. Additionally, peripheral interface 412 operates in substantially the same manner as peripheral interface 324; peripheral interface 412 includes at least a set of ports that enable connection of home gateway node 402 to a set of wireline CPE; the CPE includes at least one femtocell AP.

Figure 5:
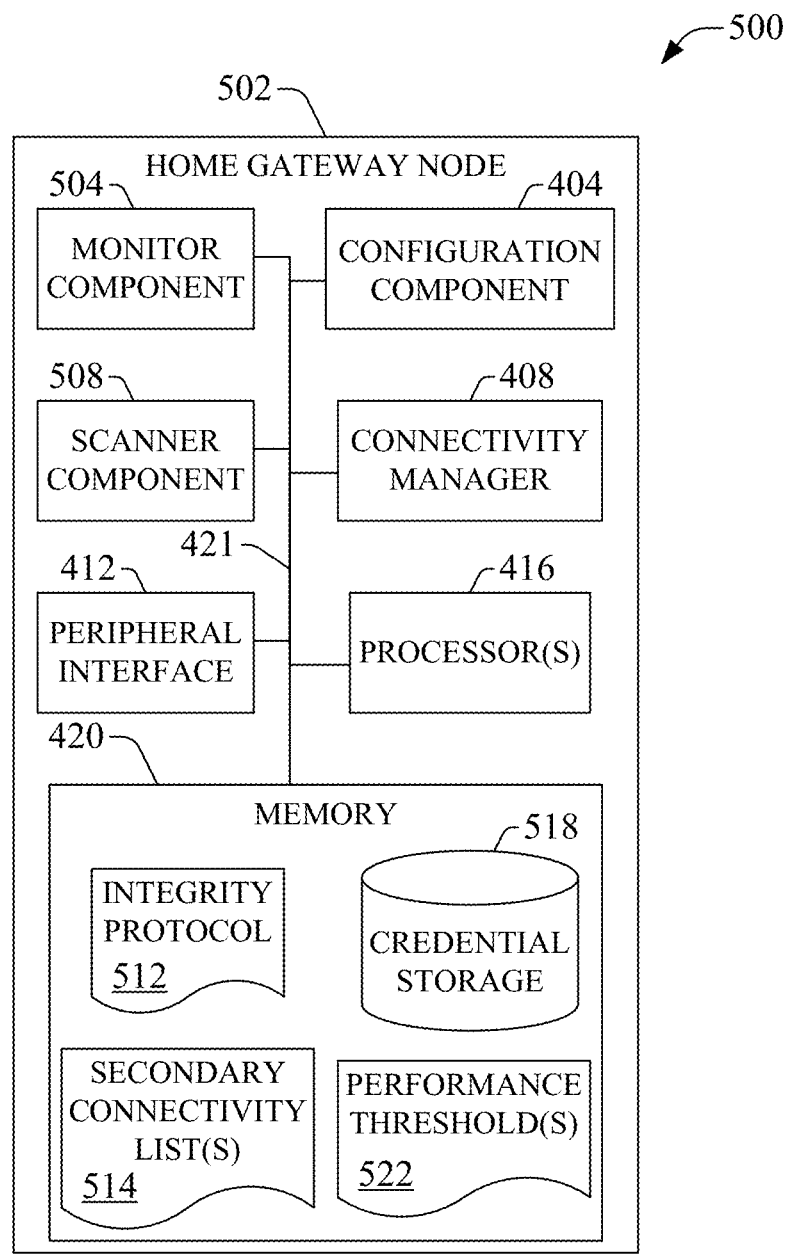

As described supra, in certain embodiments, femtocell wireless service can be preserved, in part, through establishment of a peer-to-peer wireless telecommunication channel amongst home gateway nodes. FIG. 5 illustrates an example embodiment 500 of a home gateway node that can enable retention of femtocell wireless service based in part on peer-to-peer communication and in accordance with aspects of the subject disclosure. In example embodiment 500, monitor component 504 operates in the same or substantially the same manner as monitor component 316. In an aspect, monitor component 504 can evaluate performance of a backhaul link connection amongst home gateway 502 and a gateway node within a femto network platform (e.g., 202). Monitor component 504 can determine at least one performance condition and compare the at least one performance condition with a group of performance thresholds. Based at least on the comparison, monitor component 504 can evaluate performance of the telecommunication channel. The performance threshold can be retained as part of performance threshold(s) 522, which is a memory element (register, database, file, etc.) within memory 340. In another aspect, to evaluate performance of the backhaul link connection, monitor component 504 can assess one or more performance conditions of a packet-based protocol tunnel (e.g., a VPN tunnel based on IPSec or GPRS Tunnel Protocol) and compare the one or more performance conditions to a set of performance thresholds, which can be part of performance threshold(s) 522.

In a scenario in which performance of the backhaul link connection amongst home gateway 502 and a gateway node within a femto network platform (e.g., 202) is deficient, e.g., below a predetermined threshold, scanner component 508 can detect one or more home gateway nodes that operate in a wireless environment surrounding home gateway node 502. In addition, scanner component 508 can establish a wireless telecommunication channel with a detected home gateway node that is available to support such wireless telecommunication channel. Scanner component 508 operates in the same or substantially the same manner as scanner component 320. In an aspect, scanner component 508 can determine if a detected home gateway node can allow a wireless telecommunication channel. For instance, scanner component 508 can transmit a request for service to the detected home gateway node. In response, scanner component 508 can receive an acknowledgement (ACK) signal in case the home gateway node has radio resources (e.g., available bandwidth) or processing resources (processor capacity, available memory, etc.) to enable the wireless telecommunication channel. If the detected home gateway node is unable to establish the wireless telecommunication channel, scanner component 508 can receive a no-acknowledgement (NACK) signal or any other type of rejection indication. As described supra, a connectivity manager (e.g., 408) in the detected home gateway node can assess availability condition thereof and deliver an indication (ACK signal, NACK signal) accordingly.

In home gateway node 502, configuration component 404 can enable a network server (e.g., a provisioning server within OSS/BSS 238) to provision a set of home gateway nodes and respective set of security credentials. As part of provision of such sets, identification (ID) codes or tokens for at least one home gateway node in the set of home gateway nodes can be stored in secondary connectivity list(s) 514; configuration component 404 can receive the ID codes or tokes and retain them in secondary connectivity list(s) 514. In addition, credential storage 518 can retain the set of security credentials associated with the set of home gateway nodes; configuration component 404 can receive the set of security credentials and retain it in credential storage 518. In an aspect, credential storage 518 also can retain the content or substantially the content stored in credential storage 424, while secondary connectivity list(s) 514 also can retain the content or substantially the content of secondary connectivity list(s) 426. In one or more embodiments, the set of security credentials includes at least one encryption key, at least one encrypted authentication passcode, or the like. As indicated supra, a security credential in the set of security credentials allows authentication of a home gateway node in the set of home gateway nodes with home gateway node 502 and vice versa. Integrity protocol 512 can include one or more protocols (Kerberos, RADIUS, Diameter, Light Weight Directory Access Protocol (LDAP), etc.) that enable such authentication.

Home gateway node 502 can communicate wirelessly through a communication platform (not shown), and respective antenna(s) (not shown), that operates in substantially the same manner as communication platform 304. The communication platform (not shown) in home gateway node 502 includes at least the same functional elements (components, antennas, mod/demod, coder/decoder, multimode chipset(s), etc.) as the communication platform 304.

In the illustrated embodiments, home gateway node 402 and home gateway node 502 includes processor(s) 416. The processor(s) 416 can be configured to enable or that enable, at least in part, the functionality of substantially any or any component(s), interface(s), and so forth, within the home gateway node 402 or the home gateway node 502 in accordance with one or more aspects of the described operation of such home gateway nodes. In home gateway node 402 and in home gateway node 502, processor(s) 416 can be functionally coupled to each functional element (component, interface, memory, etc.) within home gateway node 402 and to memory 420 through bus 421. In an aspect, the bus 421 can be embodied in at least one of a memory bus, a system bus, an address bus, a message bus, a power bus, or one or more reference link(s) or interface(s). In example embodiments 400 and 500, processor(s) 416 is illustrated as external to the various functional elements (component(s), interface (s), etc.) of home gateway node 402 and home gateway node 502; however, in additional or alternative embodiment(s), processor(s) 416 can be distributed amongst a plurality of such functional elements. In some embodiment(s), one or more functional elements that comprise home gateway node 402 and home gateway node 502 can reside within memory 420 as one or more sets of computer-executable code instructions that, when executed by processor(s) 416, implement the various functional elements and described functionality thereof.

Processor(s) 416 also can supply information to and retrieve information from memory 420. Such information can enable, at least in part, operation of or can provide, at least in part, functionality to communication platforms (not shown) that are part, respectively, of home gateway node 402 and home gateway node 502, and at least a portion of functional elements that are part of the communication platforms. In addition, such information also can enable, at least in part, operation of or can provide, at least in part, functionality to other operational components (not shown) of home gateway node 402 or home gateway node 502. The information can include at least one of code instructions, code structure(s), data structures, or the like.

Processor(s) 416 can execute computer-executable code instructions (not shown) stored in memory 420, for example within application storage (not shown), or other memory(ies) functionally coupled to home gateway node 402 or home gateway node 502, to provide, at least in part, the described functionality of home gateway node 402 or home gateway node 502. Such computer-executable code instructions can include program modules or software applications or firmware applications that implement various methods described in the subject disclosure and associated, at least in part, with functionality or operation of home gateway node 402 or home gateway node 502.

In addition to the various memory elements described supra, memory 420 also can retain, at least in part in the foregoing application storage (not shown), at least one of data structures (e.g., objects, classes, metadata); code structure(s) (e.g., modules, procedures) or code instructions; or substantially any type of software application(s) or firmware application(s) that processor(s) 416 can execute to enable, at least in part, functionality associated with substantially any or any component(s), interface(s), or functional element(s) within home gateway node 402 or home gateway node 502 in accordance with aspects described herein. In addition, memory 420 can store network or device information, e.g., within data storage (not shown), such as one or more communication protocol(s) or technical specification(s) for communication with disparate home gateway nodes or femtocell AP(s). Moreover, memory 420 can retain content(s) such as multimedia files or subscriber-generated data. Memory 420 can include affixed or removable elements such as memory card(s). In one or more embodiments, at least a portion of memory 420 and content thereof can be external to home gateway node 402 or home gateway node 502 and linked thereto via a peripheral interface.

Figure 6:
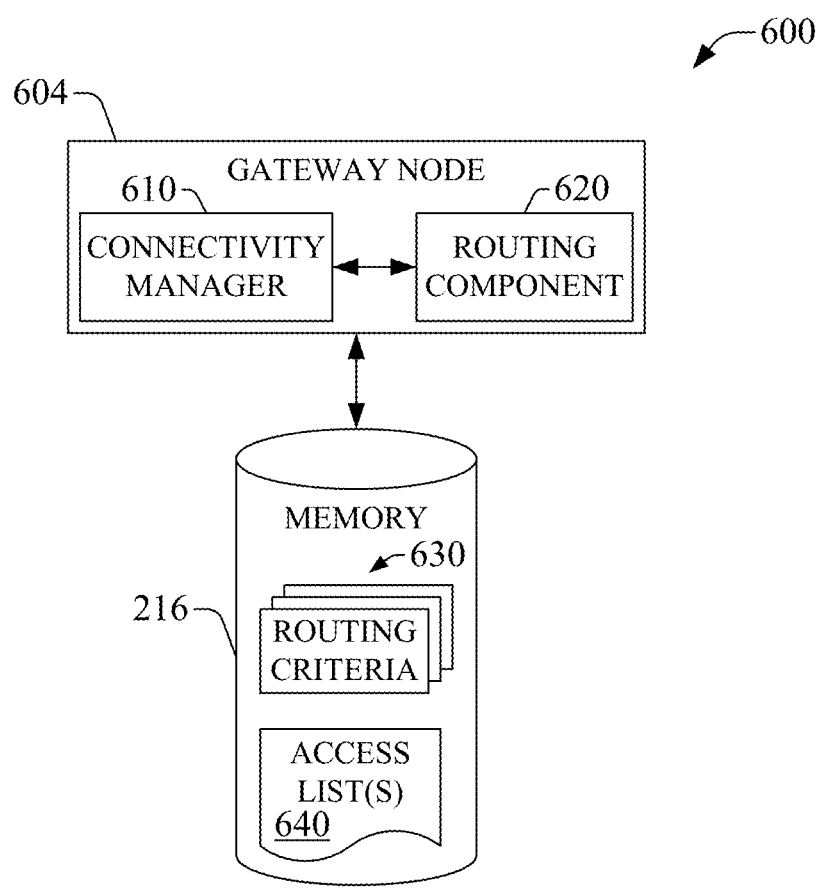
FIG. 6 represents an example embodiment of a gateway node that enables retention of femtocell wireless service in accordance with aspects described herein.

FIG. 6 represents an example embodiment 600 of a gateway node that enables retention of femtocell wireless service in accordance with aspects described herein. Gateway node 604 can embody a gateway node in the set of one or more gateway node(s) 204. Connectivity manager component 610, also referred to as connectivity manager 610 in the subject disclosure and annexed drawings, enables gateway node 604 to establish a plurality of packet-based protocol tunnels (e.g., VPN tunnel) per femtocell AP; for instance, connectivity manager 610 associates an ID code or token the femto AP with more than one VPN tunnel. Accordingly, gateway node 604 can exchange data and signaling with the femto AP via more than one VPN tunnel. In addition, connectivity manager 610 can switch from a first packet-based protocol tunnel associated with a femto AP to a second packet-based protocol tunnel associated with the femto AP. Upon or after switching from the first packet-based protocol tunnel to the second packet-based protocol tunnel, connectivity manager 610 can maintain an access list linked to the femto AP irrespective of switching to the second packet-based protocol tunnel; the access list can be part of access list(s) 640, which is a memory element (register, database, file, etc.) within memory 216. In an aspect, connectivity manager 610 can receive signaling (e.g., an indication) that a current telecommunication channel with a femto AP is to be switched to an updated telecommunication channel. In response to such signaling, connectivity manager 610 can direct a routing component 620 to receive and deliver traffic and signaling to the femto AP via the updated telecommunication channel. In another aspect, connectivity manager 610 can receive signaling (e.g., an indication) to exchange traffic and signaling with a femto AP via a plurality of telecommunication channels; in response to such signaling, connectivity manager 610 can direct routing component 620 to receive and deliver traffic and signaling to the femto AP via the plurality of telecommunication channels.

In addition or in the alternative, gateway node 604 can determine routing of terminating traffic or signaling to a femto AP. In an aspect, connectivity manager 610 can monitor performance of one or more telecommunication channels (e.g., VPN tunnel) and, based at least on the performance, route traffic or signaling via a specific telecommunication channel; for instance, connectivity manager 610 can determined whether a telecommunication channel is active, inactive, or performing inadequately (as measured via one or more KPIs). For a telecommunication channel that is inactive or performing inadequately, connectivity manager 610 can exploit at least one routing criteria to select a telecommunication channel and direct routing component 620 to deliver and receive traffic through the selected telecommunication channel. The at least one routing criteria can be part of routing criteria 630, which a memory element (register, database, file, etc.) within memory 216.

In the illustrated embodiment, a processor (not shown) that is part of server(s) 208 can be configured to enable or can enable, at least in part, the functionality of gateway node 604 or one or more components therein. To at least such end, and as described supra, the processor (not shown) can execute one or more sets of computer-executable code instructions stored in memory 216. In alternative or additional embodiments, one or more of connectivity manager 610 or routing component 620 can reside within memory 216, stored as one or more sets of computer-executable code instructions that can be executed by the processor (not shown) to implement the functionality of such component(s) as described supra. In certain embodiments, gateway node 604 can include or be functionally coupled to at least one processor configured to enable or that can enable, at least in part, the functionality of gateway node 604 or one or more components therein. To at least that end, the at least one processor can operate in the same or substantially the same manner as the processor (not shown) that is part of server(s) 208 and has been described supra.

Figure 7:
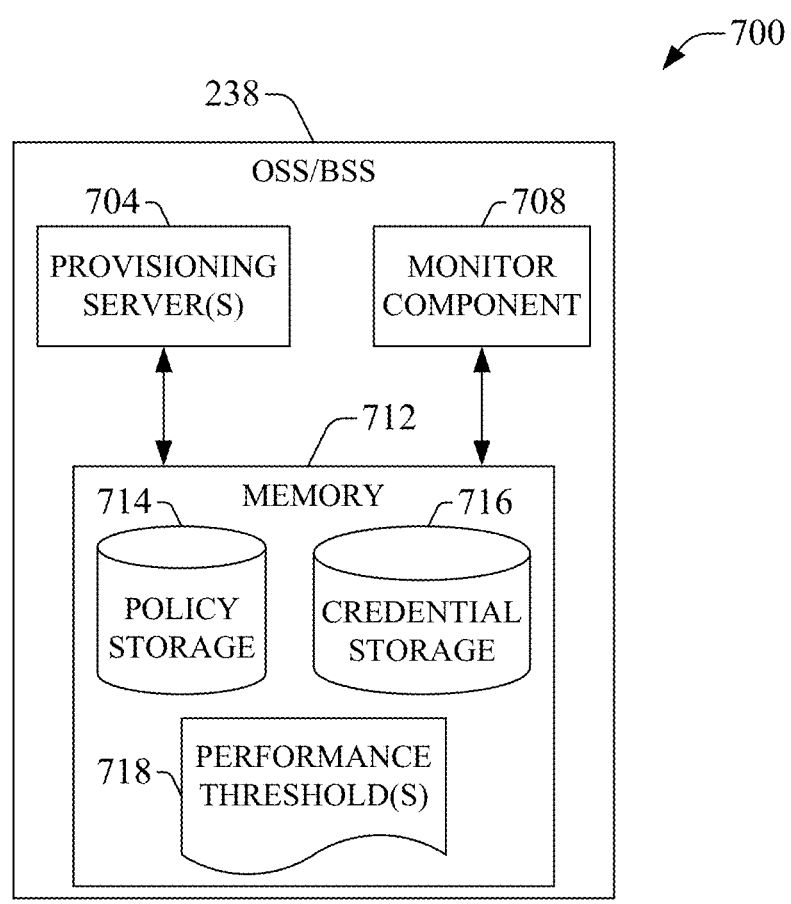
FIG. 7 illustrates an example embodiment of example OSS/BSS in accordance with aspects described herein.

As described supra, to enable retention of femtocell wireless service, a network server can provision at least one femtocell AP or at least one home gateway node. In addition, retention of such service also includes monitoring of performance of backhaul link(s) and related telecommunication channels (e.g., VPN tunnels). FIG. 7 illustrates an example embodiment 700 of OSS/BSS 238 in accordance with aspects described herein. Provisioning server(s) 704 can include at least one server that can provision at least one a group of home gateway nodes and a group of femtocell access points that can be employed to retain femtocell wireless service as described herein. The at least one server can provision each of such groups in accordance with a specific policy, which can be retained in policy storage 714; in an embodiment, a server within provisioning server(s) 704 can enable to configure the specific policy. In one or more scenarios, the at least one server provisions each of such groups at a time of or after installation of a femtocell access point and prior to activation of a femto AP linked to at least one of such groups. It should be appreciated that in alternative scenarios, at least one of the group of home gateway nodes or the group of femtocell APs can be provision after activation of the femto AP linked to at least one of such groups. Configuration of a policy can include at least one of generation, deletion, or modification, storage in memory, integration, or the like. In an aspect, the at least one server can supply a list that identifies each home gateway node in the group of home gateway nodes or a list that identifies each femtocell AP in the group of femtocell APs. Such list(s) can be delivered to a home gateway node or a femtocell AP. In addition, the at least one server can supply one or more security credentials (encryption key(s), encrypted passcode(s), etc.) associated with one or more of the group of home gateway nodes or the group of femtocell access points; the one or more security credentials are delivered to the home gateway node or the femtocell AP that receives the foregoing list(s). Credential storage 716 can retain the one or more security credentials.

Provisioning server(s) 704 also can include at least one server that configures, at least in part, one or more secondary telecommunication channels (e.g., VPN channel(s), wireless channels) amongst a first home gateway node and a second gateway node. In addition, the at least one server can configure one or more secondary telecommunication channels (e.g., VPN channel(s), wireless channels) amongst a home gateway node and a fetmocell AP.

In the illustrated example embodiment, OSS/BSS 238 can include a monitor component 708 that can assess performance of a plurality of packet-based protocol tunnels (e.g., VPN tunnels) per femtocell AP; the plurality of packet-based protocol tunnels can be established amongst the femtocell AP and a gateway node via at least one home gateway node. Monitor component 708 also can report such performance; e.g., deliver or store data that records such performance. In certain embodiments, monitor component 708 can be part of provisioning server(s) 704. Monitor component 708 can gauge performance with respect to a set of performance thresholds. A performance threshold in the set of performance thresholds can be specific to a type of telecommunication performance, e.g., radio resource availability, processing availability, data and signal transport quality, connection reliability, etc. In one or more embodiments, a key performance indicator (KPIs) characterizes a type of telecommunication performance.

A server in provisioning server(s) 704 can include one or more processors (not shown) configured to enable, or that enable, at least part of the functionality of the provisioning server(s) 704. The one or more processor can be integrated in or functionally coupled to the server. To enable at least part of the described functionality of the server, the one or more processors can execute one or more sets of computer-executable code instructions (not shown) stored in memory 712, or other memory accessible to the one or more processors. The one or more sets of computer-executable code instructions can include program module(s) or software application(s) or firmware application(s) that, when executed by the one or more processors (not shown), implement specific tasks which can be accomplished through at least one of the example methods described in the subject disclosure and that are associated, at least in part, with functionality of the server in the provisioning server(s) 704. In certain embodiments, a server in the provisioning server(s) 704 can be embodied, at least in part, in one or more sets of computer-executable code instructions stored in a memory (e.g., 712) accessible to the one or more processors (not shown); when executed by the one or more processors, the one or more sets of computer-executable code instructions implement the server and its functionality.

In one or more embodiments, a server in provisioning server(s) 704 can include input/output (I/O) interface(s) (not shown) that enable, at least in part, networked communication. Memory 712 can be a centralized element or a distributed element.

In view of the example systems described above, example methods that can be implemented in accordance with the disclosed subject matter can be better appreciated with reference to FIGS. 8-11. For purposes of simplicity of explanation, various methods disclosed herein are presented and described as a series of acts; however, it is to be understood and appreciated that the claimed subject matter is not limited by the order of acts, as some acts may occur in different order and/or concurrently with other acts from that shown and described herein. It is noted that not all illustrated acts may be required to implement a described method in accordance with the subject specification. In addition, for example, one or more methods disclosed herein could alternatively be represented as a series of interrelated states or events, such as in a state diagram. Moreover, interaction diagram(s) or call flow(s) represent several of the example methods disclosed herein in accordance with the described subject matter; particularly in instances when disparate entities, or functional elements, enact disparate portions of one or more of the several methods. Furthermore, two or more of the disclosed example methods can be implemented in combination, to accomplish one or more features or advantages described in the subject disclosure.

Methods disclosed throughout the subject specification and annexed drawings are capable of being stored on an article of manufacture (e.g., a removable volatile memory or non-volatile memory) to facilitate transporting and transferring such methods to computers for execution, and thus implementation, by a processor, or for storage in a memory. In an aspect, one or more processors, such as processor(s) that enact the one or more method described herein, can be employed to execute code instructions retained in a memory (volatile or non-volatile), or any computer- or machine-readable storage medium, to implement one or more of the method described herein. Such code instructions provide a computer- or machine-executable framework to enact the various methods described herein.

Figure 8:
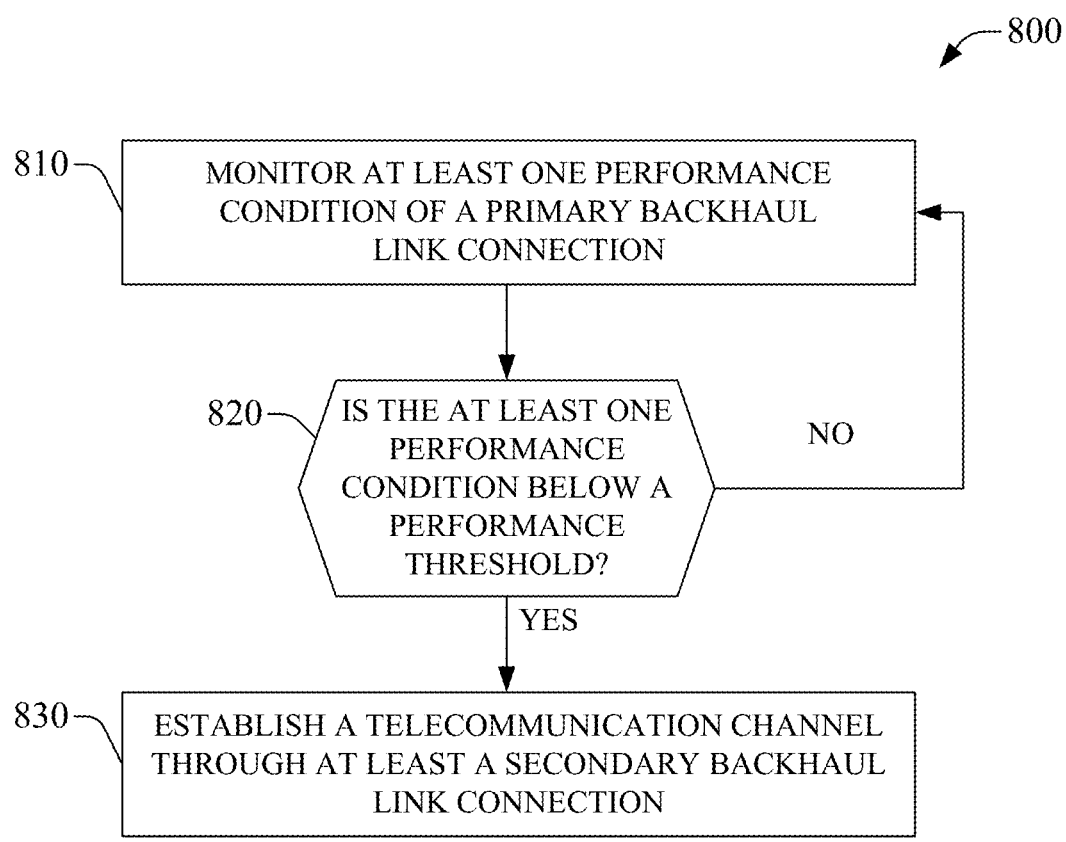
FIG. 8 illustrates an example method for providing femtocell service through a secondary channel according to an aspect of the subject disclosure.

FIG. 8 is a flowchart of an example method 800 for providing femtocell service through a secondary channel according to an aspect of the subject disclosure. In one or more embodiments, a home gateway node, or one or more component(s) therein, can implement, at least in part, the subject example method. In alternative or additional embodiments, a femtocell AP can implement (e.g., execute) the subject example method. In an aspect, one or more processors configured to provide or that provide at least part of the functionality to the home gateway node or the femtocell AP also can enact, at least in part, the subject example method. In a further aspect, in scenarios in which the one or more components of the home gateway node or the femtocell AP are embodied in one or more sets of code instructions stored in a memory, at least one processor that executes the one or more sets of code instructions, can enact the subject example method.

At act 810, at least one performance condition of a primary backhaul link connection is monitored. As described supra, a performance condition can be characterized by one or more KPIs that can convey state of connectivity and features of traffic and signaling associated thereto. In one or more embodiments, monitoring the performance condition of the primary backhaul link connection includes evaluating at least one KPI related to the primary backhaul link. At act 820, it is determined if the at least one performance condition is below a performance threshold. At act 830, a telecommunication channel is established through at least a secondary backhaul link connection. As indicated supra, the telecommunication channel can be a packet-based protocol tunnel, such as a VPN tunnel based on IPSec or GPRS Tunnel Protocol (GTP).

Figure 9:
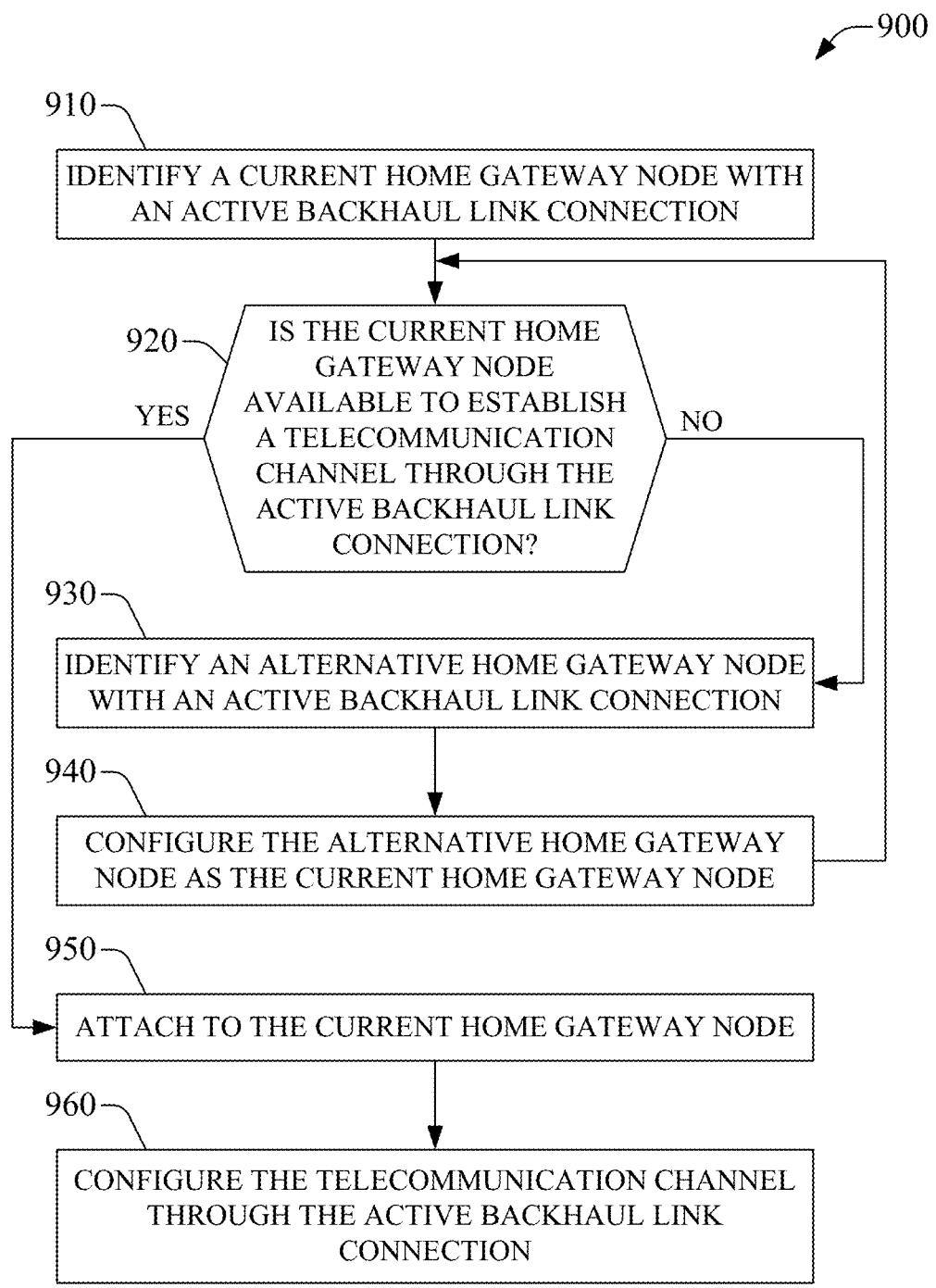
FIGS. 9-10 represents example methods for establishing a telecommunication channel through a secondary backhaul link connection according to aspects described herein.
Figure 10:
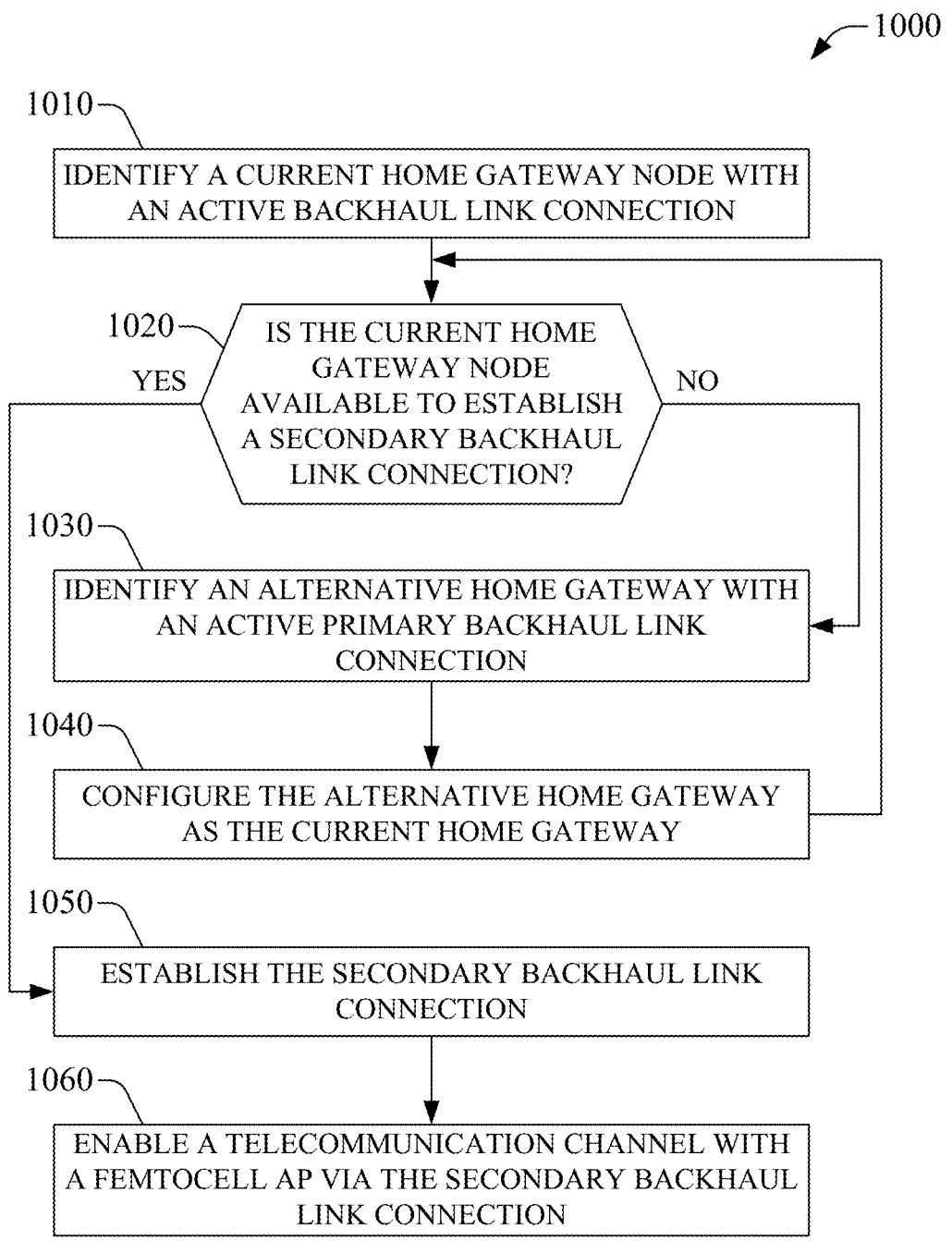

FIGS. 9-10 present flowcharts of example methods 900 and 1000, respectively, for establishing a telecommunication channel through a secondary backhaul link connection according to aspects described herein. The subject example methods can embody act 830. A femtocell AP, or one or more components therein, can effect (e.g., execute) example method 900. In another aspect, one or more processors configured to provide or that provide at least part of the functionality to the femtocell AP also can enact, at least in part, the example method 900. At act 910, a current home gateway with an active backhaul link connection is identified. Identifying the current home gateway can include scanning a wireless environment in vicinity of the fremtocell AP that effects the subject example method, and processing (e.g., decoding, analyzing, or storing) pilot signal(s) collected as part of the scanning.

At act 920, it is determined if the current home gateway available to establish a telecommunication channel (a packet-based protocol channel, such as a VPN channel, for example) through the active backhaul link connection. In an aspect, the determining includes transmitting a request for service to the current home gateway and receiving a response (e.g., an indication) that conveys if the current home gateway is available to establish the telecommunication channel through the active backhaul link connection. As described supra, if the current home gateway has radio resources (e.g., available bandwidth) or processing resources (processor capacity, available memory, etc.) to enable the secondary backhaul link connection, the response can be affirmative, such as an ACK signal or a reply message (e.g., a Diameter message) that indicates availability of the current home gateway. In contrast, if the current home gateway node is unable to establish the secondary backhaul link connection, the response can be negative, e.g., a no-acknowledgement (NACK) signal or any other type of rejection message.

A negative outcome of the determination at act 920 leads to act 930, at which an alternative home gateway with an active backhaul link connection is identified. At act 940, the alternative home gateway is configured as the current home gateway. In an aspect, the configuration is logical and enables screening additional home gateway(s) with an active backhaul link connection. As an example, the configuring includes setting a logic variable a value that indicates the alternative home gateway is to be processed as a current home gateway. In the alternative, a positive outcome at act 920 leads to act 950, at which attachment to the current home gateway is performed. In an aspect, the femtocell AP that implements the subject example method attaches to the current home gateway; attachment is wireless and can be effected according one of various radio communication protocols. In addition, the attaching includes authenticating access to the femtocell AP from the current home gateway node, and authenticating access from the femtocell AP to the current home gateway node; the authenticating exploits at least one security credential provisioned to the femtocell AP and the current home gateway node. At act 960, the telecommunication channel is configured through the active backhaul link connection.

Regarding example method 1000, in an aspect, a home gateway node, or one or more components therein, can effect (e.g., execute) the subject example method. In another aspect, one or more processors configured to provide or that provide at least part of the functionality to the home gateway node also can enact, at least in part, the subject example method. At act 1010, a current home gateway with an active primary backhaul link connection is identified. Identifying the current home gateway can include scanning a wireless environment in vicinity of the home gateway node that effects example method 1000, and processing (e.g., decoding, analyzing, or storing) wireless pilot signal(s) collected as part of the scanning. A component (e.g., scanner component 508) in the home gateway node that effects the subject example method 1000 can execute, at least in part, the subject act. At act 1020, it is determined if the current home gateway node is available to establish a secondary backhaul link connection. In an aspect, the determining includes transmitting a request for service to the current home gateway and receiving a response (e.g., an indication) that conveys if the current home gateway is available to establish the secondary backhaul link connection. As described supra, if the current home gateway has radio resources (e.g., available bandwidth) or processing resources (processor capacity, available memory, etc.) to enable the secondary backhaul link connection, the response can be affirmative, such as an ACK signal or a reply message (e.g., a Diameter message) that indicates availability of the current home gateway. In contrast, if the current home gateway node is unable to establish the secondary backhaul link connection, the response can be negative, e.g., a no-acknowledgement (NACK) signal or any other type of rejection message.

A negative outcome of the determination at act 1020 leads to act 1030, at which an alternative home gateway with an active primary backhaul link connection is identified. At act 1040, the alternative home gateway is configured as the current home gateway. In an aspect, the configuration is logical and enables screening additional home gateway(s) with an active backhaul link connection. As an example, the configuring includes setting a logic variable a value that indicates the alternative home gateway is to be processed as a current home gateway. In the alternative, a positive outcome at act 1020 leads to act 1050, at which the secondary backhaul link connection is established. At act 1060, a telecommunication channel (e.g., a VPN tunnel) with a femtocell AP via the secondary backhaul link connection is enabled.

Figure 11:
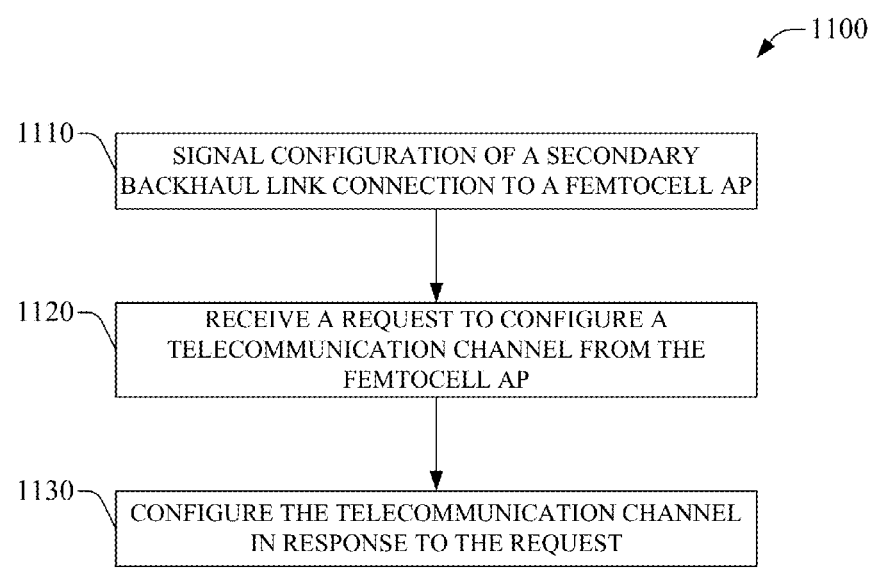
FIG. 11 illustrates an example method for enabling a telecommunication channel with a femtocell through a secondary backhaul link connection according to aspects described herein.

FIG. 11 is a flowchart of an example method 1100 for enabling a telecommunication channel with a femtocell through a secondary backhaul link connection according to aspects described herein. The subject example method can embody act 1060. Accordingly, functional element(s) (component(s), home gateway nodes, etc.) that can implement example method 900 also can implement the subject example method. At act 1110, configuration, or establishment, of a secondary backhaul link connection is signaled (e.g., an indication is delivered) to a femtocell AP. At act 1120, a request to configure a telecommunication channel is received from the femtocell AP. As indicated supra, the telecommunication channel can be a packet-based protocol tunnel, such as a VPN tunnel based on IPSec or GTP. At act 1130, the telecommunication channel is configured in response to the request.

Various advantages emerge from the aspects or features described in the subject disclosure. For example, customer satisfaction is improved through allowance of always-on connectivity. In addition, such always-on connectivity can provided differently to different customer segments. Always-on or substantially always-on connectivity also preserves revenue for the service provider or network operators, since outage of usage-based services can be mitigated or avoided even in scenarios in which a primary WAN VPN connection is compromised (e.g., lost). As another example, applications and related services that are bandwidth intensive can be supported without substantive detriment to performance of the service; a plurality of telecommunication channels (e.g., VPN tunnels) can enable such applications and related services. Accordingly, the subject disclosure can enable new revenue generation. As yet another example, interaction of subscribers with customer support staff that generally can result from loss of service or related problems can be mitigated or eliminated. Thus, service provider costs can be reduced. In the subject disclosure, enablement of the always-on or substantially always-on connectivity does not cause changes to femtocell deployment architectures and preserves aspects of management and provisioning of ID codes or tokens of wireless devices that can be part of an access control list associated with deployed femtocell APs. Accordingly, the various features or aspects described herein are superior to solution for always-on connectivity that rely on connection amongst disparate femtocell access points or connection amongst a wireless device served by a primary femto AP and a secondary femto AP.

As it is employed in the subject disclosure, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification and annexed drawings, terms such as "store," "data store," "data storage," "database," "repository," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. In addition, memory elements described herein can be affixed, removable, or a combination thereof.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Various aspects or features described herein may be implemented as a method, apparatus, or article of manufacture using standard programming and/or engineering techniques. In addition, various aspects disclosed in the subject specification can also be implemented through code instructions, or program modules, stored in a memory and executed by a processor, or other combination of hardware and software, or hardware and firmware. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disc (CD), digital versatile disc (DVD), blu-ray disc (BD) . . . ), smart cards, and flash memory devices (e.g., card, stick, key drive . . . ).

It should be appreciated that while various aspects, features, or advantages described herein have been illustrated through femtocell access point(s) and associated coverage, such aspects or features also can be exploited in confined-coverage access point(s) that provide wireless coverage through substantially any or any disparate telecommunication technologies, such as for example Wi-Fi (wireless fidelity) or picocell telecommunication. Moreover, aspects, features, or advantages of the subject disclosure can be exploited in substantially any wireless telecommunication, or radio, technology; for example, Wi-Fi, Worldwide Interoperability for Microwave Access (WiMAX), Enhanced General Packet Radio Service (Enhanced GPRS), 3GPP LTE, 3GPP2 UMB, 3GPP UMTS, HSPA, HSDPA, HSUPA, or LTE Advanced. Furthermore, substantially all aspects of the subject disclosure can include legacy telecommunication technologies. Further yet, various aspects, features, or advantages of the subject disclosure are described in connection with a home gateway node. However, such aspects, features, or advantages, can be accomplished for substantially any CPE that serves as a local gateway device or local gateway node for a confined-coverage AP, even though such CPE can be deployed in an enterprise facility (e.g., a factory, an office building . . . ) rather than a home.

What has been described above includes examples of systems and methods that provide advantages of the subject disclosure. It is, of course, not possible to describe every conceivable combination of components or methodologies for purposes of describing the subject disclosure, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:
in response to receiving an indication of a change in a performance condition associated with a first communication path between a mobile device and a destination device, wherein the first communication path comprises a first backhaul link between a first gateway device and a first access network device, determining, by a system comprising a processor, a second gateway device available to utilize a second communication path between the mobile device and the destination device;
in response to determining that the second communication path does not comprise a second backhaul link between the second gateway device and a second access network device, facilitating, by the system, establishing the second backhaul link between the second gateway device and the second access network device; and
in response to determining that the second backhaul link has been established between the second gateway device and the second access network device, and based on the change in the performance condition, enabling, by the system, transitioning a portion of communications from employing the first communication path to employing the second communication path.

2. The method of claim 1, wherein the second communication path comprises a packet-based tunnel.

3. The method of claim 1, wherein the first communication path comprises a first femtocell access point device that provides wireless coverage to a defined wireless environment and the second communication path comprises the first femtocell access point device.

4. The method of claim 1, wherein the first communication path comprises a first femtocell access point device that provides wireless coverage to a defined wireless environment and the second communication path comprises a second femtocell access point device that provides wireless coverage to the defined wireless environment.

5. The method of claim 1, wherein the enabling the transitioning the portion of communications comprises facilitating establishing a wireless link between the first gateway device and the second gateway device.

6. The method of claim 1, wherein the enabling the transitioning the portion of communications comprises facilitating establishing a wired link between the first gateway device and the second gateway device.

7. The method of claim 1, wherein the indication of the change in the performance condition comprises information indicating that the first backhaul link has become disconnected.

8. The method of claim 1, wherein the indication of the change in the performance condition comprises information indicating that the first backhaul link does not satisfy a determined performance metric.

9. The method of claim 1, wherein the indication of the change in the performance condition comprises information indicating that the first backhaul link is intermittently disconnected.

10. The method of claim 1, wherein the enabling the transitioning the portion of the communications comprises transitioning all of the communications employing the first communication path to the second communication path.

11. The method of claim 1, wherein the enabling the transitioning the portion of the communications comprises transitioning less than all of the communications employing the first communication path to the second communication path.

12. The method of claim 1, wherein the first communication path comprises a first wireless link between the mobile device and a first femtocell access point device communicatively connected to the first gateway device.

13. The method of claim 12, wherein the enabling the transitioning the portion of the communications comprises adapting the second communication path to comprise the first wireless link and the first femtocell access point device.

14. The method of claim 12, wherein the enabling the transitioning the portion of the communications comprises adapting the second communication path to comprise a second wireless link between the mobile device and a second femtocell access point device communicatively connected to the second gateway device, and wherein the second communication path bypasses the first femtocell access point and the first gateway device.

15. The method of claim 12, wherein the enabling the transitioning the portion of the communications comprises facilitating establishing a communicative connection between the first gateway device and the second gateway device and adapting the second communication path to comprise the first wireless link, the first femtocell access point, the first gateway device, and the second gateway device, and wherein the second communication path bypasses the first backhaul link between the first gateway device and the first access network device.

16. A system, comprising:
a processor; and
a memory that stores executable instructions that, when executed by the processor, facilitate performance of operations, comprising:
in response to receiving an indication of a change in a performance condition associated with a first communication path between a mobile device and a destination device, wherein the first communication path comprises a first backhaul link between a first gateway device and a first access network device, facilitating establishing a second communication path via a second gateway device, and wherein the second communication path between the mobile device and the destination device comprises a second backhaul link between the second gateway device and a second access network device; and
transitioning, based on the change in the performance condition, a portion of communications employing the first communication path to the second communication path.

17. The system of claim 16, wherein the first communication path comprises a first femtocell access point device that provides wireless coverage to a defined wireless environment and the second communication path comprises the first femtocell access point device.

18. The system of claim 16, wherein the first communication path comprises a first femtocell access point device that provides wireless coverage to a defined wireless environment and the second communication path comprises a second femtocell access point device that provides wireless coverage to the defined wireless environment.

19. A non-transitory machine-readable storage medium, comprising executable instructions that, when executed by a processor, facilitate performance of operations, comprising:
receiving an indication of a change in a performance condition associated with a first communication path between a mobile device and a destination device, wherein the first communication path comprises a first backhaul link between a first gateway device and a first access network device;

in response to the indication of the change in the performance condition, enabling establishing a second communication path between the mobile device and the destination device, wherein the second communication path comprises a second backhaul link between a second gateway device and a second access network device; and transitioning, based on the change in the performance condition, a portion of communications employing the first communication path to the second communication path.

20. The non-transitory machine-readable storage medium of claim 19, wherein the change in the performance condition is related to a reduced performance characteristic determined to be exhibited by the first backhaul link.

* * * * *